United States Patent [19]
Leimbach et al.

[11] Patent Number: 5,678,671
[45] Date of Patent: Oct. 21, 1997

[54] MOTOR VEHICLE CLUTCH ASSEMBLY HAVING AN ACTUATOR DEVICE, WHICH ACTUATOR DEVICE HAS A CLUTCH MOTION BLOCKING SYSTEM

[75] Inventors: Lutz Leimbach, Oberwerrn; Reiner Voss, Maibach, both of Germany

[73] Assignee: Fichtel & Sachs AG, Schweinfurt, Germany

[21] Appl. No.: 594,582

[22] Filed: Jan. 31, 1996

[30] Foreign Application Priority Data

Feb. 1, 1995 [DE] Germany .................. 195 03 137.7

[51] Int. Cl.⁶ .................. G05G 5/06; G05G 5/04; B60K 23/02
[52] U.S. Cl. .................. 192/70.22; 192/82 P; 192/84.6; 192/90; 192/91 R; 192/114 R
[58] Field of Search .................. 192/84.6, 82 P, 192/70.22, 85 C, 91 A, 114 R, 90, 20, 70.27, 91 R

[56] References Cited

U.S. PATENT DOCUMENTS

| | | |
|---|---|---|
| 3,831,456 | 8/1974 | Jahnke . |
| 3,874,747 | 4/1975 | Case et al. . |
| 4,526,058 | 7/1985 | Runkel et al. . |
| 4,591,034 | 5/1986 | Tellert et al. .................. 192/84.6 X |
| 4,648,498 | 3/1987 | Herbulot et al. .................. 192/84.6 X |
| 4,651,855 | 3/1987 | Grunberg .................. 192/90 X |
| 4,750,596 | 6/1988 | Grunberg et al. . |
| 4,829,221 | 5/1989 | Grunberg et al. .................. 192/90 X |
| 4,878,396 | 11/1989 | Grunberg .................. 192/90 X |
| 5,024,299 | 6/1991 | Shaw et al. . |
| 5,048,656 | 9/1991 | Braun .................. 192/114 P X |
| 5,056,632 | 10/1991 | Lemp et al. .................. 192/114 P X |
| 5,119,913 | 6/1992 | Focqueur et al. .................. 192/84.6 X |
| 5,267,635 | 12/1993 | Peterson et al. .................. 192/84.6 X |
| 5,273,143 | 12/1993 | Voss et al. .................. 192/84.6 X |
| 5,353,902 | 10/1994 | Flowtow et al. .................. 192/84.6 |
| 5,359,884 | 11/1994 | Fey et al. . |
| 5,507,373 | 4/1996 | Nguyen .................. 192/82 P X |

FOREIGN PATENT DOCUMENTS

| | | |
|---|---|---|
| 0334435 | 9/1989 | European Pat. Off. . |
| 0538802 | 4/1993 | European Pat. Off. . |
| 3237509 | 4/1984 | Germany . |
| 2112100 | 7/1983 | United Kingdom .................. 192/70.22 |
| 2112101 | 7/1983 | United Kingdom .................. 192/70.22 |

*Primary Examiner*—Rodney H. Bonck
*Attorney, Agent, or Firm*—Nils H. Ljungman and Associates

[57] ABSTRACT

A motor vehicle clutch assembly has an actuator device. The clutch assembly is a friction clutch assembly. The actuator device moves linearly and is for engaging and disengaging the clutch. The actuator device is powered by a motor. The actuator device has a device for blocking the linear movement of the actuator device in a preferred position, thereby reducing work done by the motor.

8 Claims, 7 Drawing Sheets

MOTOR VEHICLE CLUTCH ASSEMBLY HAVING AN ACTUATOR DEVICE, WHICH ACTUATOR DEVICE HAS A CLUTCH MOTION BLOCKING SYSTEM

BACKGROUND OF THE INVENTION

1. Field of the Invention

This invention relates to an actuator device, in particular for a motor vehicle, and more particular to a motor vehicle clutch assembly having an actuator device, which actuator device has a clutch motion blocking system.

2. Background Information

In vehicles and motor vehicles, clutches can be actuated by actuator devices. For example, to actuate clutches, clutch systems detect the activation position of the clutch pedal specified by the driver of the motor vehicle, and the clutch system then operates an actuator motor which in turn operates the clutch mechanism accordingly. The actuator motor, by means of a worm gear which is attached to its output shaft, drives a segment worm gear which is engaged with the worm gear and is mounted on an axis of rotation. One end of a tappet or lever is attached eccentrically and rotationally to the segment worm gear. The other end of the tappet is connected, for example, to a piston or a piston rod of a master cylinder to convert, as the segment worm gear rotates when the actuator motor is operated, the rotational motion into a linear motion of the piston or of the piston rod of the master cylinder by means of the tappet. In the master cylinder, a fluid pressure is subsequently generated in a fluid pressure chamber, by means of which a slave cylinder of the clutch, which is in a fluid connection with the master cylinder, is actuated. The position of the clutch is thus adjusted by the actuator to match the position or activation position of the clutch pedal.

In vehicles and motor vehicles, a number of devices, e.g. clutches and similar devices, can be actuated by actuator devices. For example, to actuate clutches, known systems detect the activation of the clutch pedal by the driver of the motor vehicle, and operate an actuator motor accordingly. The actuator motor, by means of a worm gear which is attached to its output shaft, drives a segment worm gear which is engaged with the worm gear and is mounted on an axis of rotation. One end of a tappet is attached eccentrically and rotationally to the segment worm gear. The other end of the tappet is connected, for example, to a piston or a piston rod of a master cylinder to convert, as the segment worm gear rotates when the actuator motor is operated, the rotational motion into a linear motion of the piston or of the piston rod of the master cylinder by means of the tappet. In the master cylinder, a fluid pressure is subsequently generated in a fluid pressure chamber, by means of which a slave cylinder of the clutch, which is in a fluid connection with the master cylinder, is actuated.

But one problem with such actuator devices is that on account of the eccentric location of the tappet on the segment worm gear, when the segment worm gear rotates and is accompanied by a corresponding displacement of the master cylinder piston, the force produced by the tappet is not applied to the master cylinder piston exclusively in the direction of the linear motion of the master cylinder piston. On account of the eccentric location of the one end of the tappet, there are also force components during actuation which are applied to the master cylinder piston transversely, or at an angle to the direction of motion of the master cylinder piston. This non-linear application of force causes a problem, in that, on account of the lateral application of force to the master cylinder piston, increased friction occurs between the piston and the cylinder housing of the master cylinder, which can cause increased wear of seal elements or damage to the master cylinder. On this type of actuator, there is also an increased friction loss, on account of the lateral application of the force, which leads to an increased energy requirement for the actuation of conventional actuator devices.

EP-A-0 538 802 discloses an actuator which can be used in vehicles, e.g. to actuate centrally-controlled door locks or similar devices. On this actuator, the rotational force generated by an actuator motor is transmitted to an output element which is engaged with a worm gear which is in turn located on the output shaft of the actuator motor. The output element is thereby capable of linear movement, and acts on the element to be actuated. The output element is biased toward a limit position by a bias spring. But one problem with this actuator is that when the element to be actuated must be held in a specified position which is not the same as the limit position, and in which the output element is biased by the spring, the actuator motor must be continuously supplied with current. But since in this position, the actuator is not moved, i.e. not even the rotor of the actuator motor is rotating, the motor can be damaged by the continued current, because of the relatively high current which then flows into the windings of the motor. The holding of the actuator in the specified position by an uninterrupted flow of current to the motor also results in a relatively high energy consumption.

OBJECT OF THE INVENTION

The object of the invention is therefore to create an actuator device, in particular for a vehicle, in which damage to the element caused by undesirable applications of force can be prevented, and which actuator device can be held in an actuation position without the risk of damage to the actuator device and without the unnecessary consumption of energy.

SUMMARY OF THE INVENTION

The invention teaches that this object can be achieved by means of an actuator device which comprises an actuator motor and an output element which is coupled to the actuator motor to transmit force, and which output element can be moved, in particular in a linear manner, and which output element acts on an element to the actuated. The actuator device is characterized by movement blocking means which block the actuator device to prevent movement in at least one actuation position.

In other words, the actuator, device comprises a movement blocking means, which movement blocking means prevents movement of the actuator device. When the movement blocking means holds the actuator device in a desired position, the work done by the actuator drive motor can be reduced or possibly eliminated, which reduces both energy consumption by the actuator motor and wear on the motor.

As a result of the presence of the motion blocking means, if the actuator device of the present invention is in the at least one actuation position, the actuator device can be blocked to prevent movement in this actuation position, in which case the excitation or the flow of current to the actuator motor can be interrupted at the same time. Under these conditions, therefore, the actuator device is blocked to prevent movement only by the blocking means. Damage to the actuator motor as a result of uninterrupted excitation is thus virtually impossible. The presence of an output element which can move in linear fashion essentially guarantees that the only forces which act on the element to be actuated will be applied in the direction of motion of the output element which can move in a linear fashion, and undesirable force components can thereby essentially be eliminated.

In other words, the motion blocking means allows the actuator to be held in a specified position, an actuation position, in which case the excitation or the flow of current to the actuator motor can be interrupted at the same time. Under these conditions, therefore, the actuator device is blocked from moving by the movement blocking means alone. With the movement blocking means functioning there is no need for the actuator motor to maintain the specified position, so current to the actuator motor can be interrupted and damage to the actuator motor is thus practically impossible. The movement blocking means may block movement in just one actuator position. However, in other applications the movement blocking means may block movement in many alternate actuator positions, which may correspond to the many possible activation positions of a clutch pedal.

In addition, the presence of an output element which moves in a linear fashion essentially guarantees that all forces will be acting along the same axis. For example, the linear movement of the output element of the actuator device when connected directly to the piston of an hydraulic cylinder will drive the piston linearly, which minimizes wear on the hydraulic piston and cylinder.

The output element is thereby connected directly to the actuator motor. The actuator device can thus be manufactured economically using a minimum number of components, and on account of the small number of components, the actuator device is less sensitive to the occurrence of defects and malfunctions.

Alternatively, it is possible to couple the output element to the actuator motor by means of intermediate elements. These intermediate elements can comprise speed reduction means or speed increasing means. Thus the actuator device can be easily adapted to the specific operating requirements, which may, for example, require a high linear thrust force of the output element or a long linear stroke of the output element.

These intermediate elements which comprise speed reduction means or speed increasing means could be, for example, step-down or step-up transmissions, respectively.

The output element preferably comprises a toothed rack.

To make it possible to construct the actuator device of the invention in a manner which is as simple as possible, the invention teaches that the movement blocking means comprise mechanical movement blocking means.

The blocking means can comprise locking means, for example, which block the actuator device in the at least one actuation position by locking to prevent movement. If the actuator device must then be moved into another actuator position, all that is necessary is to re-energize the actuator motor, in which case first the locking moment of the locking means must be overcome, and then the output element can be moved into the desired actuation position.

In other words, the movement blocking means comprise locking means. The locking means are designed to engage in a desired actuation position. For example, the output element may have a projection which engages an indentation on the housing of the actuator device, thus locking the actuator device in the desired actuation position; the engaging of the projection depends solely on the position of the output element. Thus, the locking means does not require a command to release, but rather the movement of the actuator motor disengages the movement blocking means; specifically in this example, the powered movement of the output element disengages the projection of the output element from the locking indentation on the housing of the actuator device. In some applications the movement blocking means would be powerful enough to block the movement of the actuator in a functional position, but rather than releasing the movement blocking means, energizing the actuator motor would overcomes the movement blocking means, allowing the actuator to be moved to another actuation position without the release of the movement blocking means.

Alternatively, the movement blocking means can comprise wedging means which can be brought into a wedged position in the at least one actuation position, in which wedged position the actuator device is blocked against movement. Such wedging means can be moved easily into the wedging position in practically any actuation position of the actuator device of the invention, so that there can be a practically unlimited number of actuation positions in which the actuator device of the invention can be blocked to prevent movement.

The movement blocking means can also comprise a coil clamping spring which surrounds a motor output shaft of the actuator motor in a spiral fashion, as well as clamping spring release means for the selective attachment and release of the coil clamping spring in a clamped position on the motor output shaft, whereby the coil clamping spring is blocked by means of rotational movement blocking means to prevent it from rotating with the motor output shaft. With this embodiment of the movement blocking means, a practically unlimited number of clamping positions of the spiral clamping spring on the motor output shaft is possible, so that the actuator device of the invention can once again be easily blocked in a plurality of actuator positions to prevent movement.

To provide the most secure possible clamping seat of the coil clamping spring on the motor output shaft, the invention teaches that the coil clamping spring comprises at least two turns.

Alternatively, however, it is also possible that the movement blocking means can comprise means for the continuous supply of a blocking current to the actuator motor in the at least one actuation position. Therefore it is essentially not necessary to provide additional mechanical elements on the actuator device.

It is thereby advantageous if the actuator motor used to block the actuator device in the at least one actuator position requires a blocking current of less than 10 Amperes, preferably less than 6 Amperes. It thereby becomes possible to prevent an excessively high current consumption when the actuator device is blocked in the at least one actuation position.

One application may involve mechanical movement blocking means which reduce the blocking current required by the actuator motor to hold the actuator device in the at least one actuator position. That is, the mechanical movement blocking means are not capable of holding the actuator device in the at least one actuation position, but help by reducing the work required by the actuator motor.

It is also possible that a toothed blocking segment is provided on the toothed rack and/or on the element which is provided for the transmission of the rotational force from the actuator motor to the toothed rack in the vicinity of the at least one actuation position. The toothed blocking segment can thereby be realized so that it makes an independent movement of the actuator device out of the at least one actuation position difficult. This type of arrangement is advantageous in particular when the actuator device is blocked in the actuation position by the continuous supply of a current to the actuator motor, since on account of the kinetic resistance between the toothed rack and the element, there is already a slight self-locking action of the actuator device, which makes it possible to reduce the blocking current supplied to the actuator motor even further.

A possible embodiment of a toothed blocking segment is one where the teeth of the toothed blocking segment are modified to engage and tend to bind, thus blocking movement when the actuator is in the at least one actuation position. The modified teeth of the toothed blocking segment could be part of the toothed rack; that is the modified teeth are only a small segment of the total length of teeth on the toothed rack. The modified teeth of the toothed blocking segment could be part of the element which transmits rotational force from the actuator motor to the toothed rack. Lastly, the modified teeth of the toothed blocking segment could be part of both the toothed rack and the element which transmits rotational force from the actuator motor to the toothed rack. When the toothed blocking segment is engaged it makes movement of the actuator device out of the at least one actuation position difficult. This type of arrangement is advantageous in particular when the actuator device is blocked in the actuation position by the continuous supply of a current to the actuator motor, since on account of the kinetic resistance between the toothed rack and the element which transmits rotational force, there is already a slight self-locking action of the actuator device, which makes it possible to reduce the blocking current supplied to the actuator motor even further. Since the toothed blocking segment is a modification of the basic parts of the actuator, no additional mechanical elements are required for blocking.

It is also possible that the toothed blocking segment can prevent independent movement of the actuator device out of the at least one actuator position. In this case, the toothed blocking segment itself represents movement blocking means for the actuator device. If the actuator device is already in the at least one actuation position, the flow of current to the actuator motor can be completely terminated, at least if no excessive force is exerted on the toothed rack by the element to be actuated. If the actuator device is then to be moved out of the actuation position, current is again supplied to the actuator motor, and thus the blocking force of the toothed blocking segment is overcome.

To be able to easily transmit over relatively long distances the stroke of the output element, which moves in a linear manner, the invention teaches that the output element is coupled to a master cylinder, for the selective generation of a fluid output pressure in a fluid pressure chamber of the master cylinder.

The fluid pressure chamber of the master cylinder can thereby be connected to a fluid pressure chamber of a slave cylinder by means of a fluid connection in the form of a fluid line, and the movement blocking means can comprise valve means for the selective closing and opening of the fluid connection. By closing the fluid connection, and thereby interrupting the flow of the fluid between the fluid pressure chamber of the slave cylinder and the fluid pressure chamber of the master cylinder, the piston, for example, and the output element of the actuator device of the invention which is connected to the piston, can be blocked to prevent their movement. In this embodiment of the blocking means, it is once again possible to select from among a very large number of actuation positions, in which the actuator device of the invention can be blocked to prevent movement by actuating the valve means.

Biasing means can also be provided, by means of which the actuator device can be biased in at least one actuation limit position. These biasing means can, on one hand, assist the movement of the actuator device of the invention into the at least one actuation limit position, and thus reduce the energy required to drive the actuator device. On the other hand, it is also possible to use the biasing means as the blocking means, by means of which the actuator device of the invention can then be blocked in the at least one actuation limit position, to prevent independent or unintentional movement out of this actuation limit position.

This invention also relates to an actuator system, in particular for a vehicle, comprising an actuator device with movement blocking means, whereby the actuator system also comprises:

an actuator element with an activation position sensor to detect an activation position of the actuator element, and to emit an actuation position signal which corresponds to the activation position detected, an actuation position sensor to detect an actuation position of the actuator device and to emit an actuation position signal which corresponds to the actuation position detected, a control device to receive the activation position signal and the actuation position signal and to activate the drive motor as a function of the signals received, whereby the control device compares the activation position signal to the actuation position signal, and to a reference actuation value which corresponds to the at least one actuation position, and then, if the activation position detected does not correspond to the actuation position detected, activates the actuator motor to the drive mode, until the detected actuation position corresponds to the detected activation limit position, and then terminates the activation of the actuator motor in the drive mode when the activation position detected corresponds to the actuation position detected and to the at least one actuation position.

The actuator system according to one embodiment of the invention can thus determine in a simple manner by means of a comparison of the activation position signal to the actuation position signal, and to the reference actuation signal which corresponds to the at least one actuation position, whether the actuator device, as a function of the activation of the actuation element, must be moved into the at least one actuation position, or whether the actuator device is already in this at least one actuation position. The actuator system according to one embodiment of the invention can also take the necessary measures, i.e. it can activate the actuator motor, when the actuator device is not yet in the position which corresponds to the activation position, or it can deactivate the actuator motor if the actuator device is already in the position which corresponds to the activation position, an if this position also corresponds to the at least one actuation position.

This invention also relates to a clutch actuator system, in particular for a vehicle, comprising a clutch actuator device with movement blocking means, whereby the clutch actuator system also comprises:

a clutch pedal with a clutch pedal position sensor to detect a clutch pedal position of the clutch pedal, and to emit a clutch pedal position signal which corresponds to the clutch pedal positioned detected, the clutch pedal position corresponds to a desired clutch actuator position, a cluth actuator position sensor to detect a clutch actuator position of the clutch actuator device and to emit a clutch actuator position signal which corresponds to the clutch actuator position detected, a control device to receive the clutch pedal position signal and the clutch actuator position signal and to activate the drive motor as a function of the signals received, whereby the control device compares the clutch pedal position signal to the clutch actuator position signal, and the control device compares the clutch pedal position signal and the clutch actuator position signal to a reference clutch actuator position value which corresponds to the at least one desirable clutch actuator position, and then, if the clutch pedal position detected does not correspond to the clutch actuation position detected, the control device activates the actuator motor to the drive mode, the drive mode continues until the detected clutch actuator position correspond to the detected clutch pedal position, and then the control device terminates the activation of the actuator motor from the drive mode when the clutch pedal position detected corresponds to the clutch actuator position detected and to the at least one desirable clutch actuator position.

The clutch actuator system can thus determine in a simple manner, by means of a comparison of the clutch pedal position signal to the clutch actuator position signal, and to the reference clutch actuator signal which corresponds to the at least one desirable clutch actuator position, whether the clutch actuator device, as a function of the position of the clutch pedal, must be moved into the at least one desirable clutch actuator position, or whether the actuator device is already in this at least one desirable clutch actuator position. The clutch actuator system can also take the necessary measures, i.e. it can activate the actuator motor, when the clutch actuator device is not yet in the position which corresponds to the clutch pedal position, or it can deactivate the actuator motor if the clutch actuator device is already in the position which corresponds to the clutch pedal position, and if this position also corresponds to the at least one desirable clutch actuator position.

The expression "activate in drive mode", as used here, means that when the actuator motor is in this activation state, the actuator device moves from one instantaneous actuation position into another actuation position. If the "drive mode" activation of the actuator motor is discontinued, e.g. when the at least one actuation position is reached, then the actuator device stops in this at lest one actuation position. But that does not necessarily mean that the activation of the actuator motor is completely terminated; rather, as described above, it is also possible that the actuator motor may continue to be activated in the at least one actuation position, i.e. the blocking current described above must continue to be supplied to the motor. The actuator device is thereby held in the at least one actuation position by means of a continuous "blocking activation" of the actuator motor.

It is thereby preferably if the movement blocking means can be actuated by the control device to block the actuator device to prevent movement, when the activation position detected corresponds to the actuation position detected and to the at least one actuation position. As a result of the actuation of the blocking means by the control device, it is possible to provide a number of actuation positions in which the actuator device can be blocked against movement. Furthermore, it is also possible, e.g., after the actuating system of the invention has already been installed, to select additional actuation positions in which the actuator device can be blocked against movement, and which have been determined to be appropriate on the basis of practical experience, and when these actuation positions are reached, to take the necessary measures to block the actuator device to prevent movement.

This invention also relates to the use of the actuator device and of the actuation system to actuate a clutch device.

This invention also relates to the use of the actuator device and the actuator system for the actuation of a clutch device with a reduced release force. In particular when a clutch device with a reduced release force is actuated, it is possible to block the actuator device by continuously supplying a blocking current to the actuator motor in the at least one actuation position. As a result of use of the invention on a clutch device with a reduced release force, the intensity of the blocking current required to block the actuator motor can be reduced even farther.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and in the event that there is more than one invention, that these inventions may be patentable and non-obvious one with respect to the other.

One feature of the invention resides broadly in a friction clutch system for a motor vehicle with an actuator for automated operation of the clutch, the friction clutch system comprising: a clutch housing; a clutch disc for being disposed on a transmission input shaft, the transmission input shaft having a longitudinal axis defining an axial direction parallel to the longitudinal axis, the clutch disc being axially movable along the transmission input shaft; pressure plate means for engaging and disengaging the clutch disc with a flywheel, the pressure plate means being axially movable along the transmission input shaft; the clutch disc comprising: friction lining means disposed between the pressure plate meand and the flywheel for contacting the flywheel and the pressure plate means upon engagement of the clutch disc; membrane spring means disposed between the clutch housing and the pressure plate means for applying pressure to the pressure plate means; and a disengagement system for engaging and disengaging the clutch disc and the pressure plate means; the disengagement system for engaging and disengaging being connected at a part of the membrane spring means; the disengagement system comprising actuator means for automatically activating the disengagement system for engaging and disengaging the clutch disc and the pressure plate means and activating the part of the membrane spring; the actuator means comprising: actuator output means being disposed to act on the disengagement system; the actuator output means comprising means for moving the actuator output means linearly along a range of movement; the means for moving the actuator output means linearly along a range of movement comprising an actuator motor being coupled to the actuator output means, the actuator motor for the transmission of force to the actuator output means; and means for inhibiting movement of the actuator output means so as to inhibit linear movement, in at least one position, of the actuator output means.

Another feature of the invention resides broadly in a clutch actuator for automated operation of a friction clutch system for a motor vehicle, which friction clutch system comprises: a clutch housing; a clutch disc for being disposed on a transmission input shaft, the transmission input shaft having a longitudinal axis defining an axial direction parallel to the longitudinal axis, the clutch disc being axially movable along the transmission input shaft; pressure plate means for engaging and disengaging the clutch disc with a flywheel, the pressure plate means being axially movable along the transmission input shaft; the clutch disc comprising: friction lining means disposed between the pressure plate means and the flywheel for contacting the flywheel and the pressure plate means upon engagement of the clutch disc; membrane spring means disposed between the clutch housing and the pressure plate means for applying pressure to the pressure plate means; a disengagement system for engaging and disengaging the clutch disc and the pressure plate means; the disengagement system for engaging and disengaging being connected at a part of the membrane spring means; the actuator means comprising: actuator output means being disposed to act on the disengagement system for engaging and disengaging the clutch disc and the pressure plate means and activating the part of the membrane spring; the actuator output means comprising means for moving the actuator output means linearly along a range of movement; the means for moving the actuator output means linearly along a range of movement comprising an actuator motor being coupled to the actuator output means for the transmission of force to the actuator output means; means for inhibiting movement of the actuator output means so as to inhibit linear movement, in at least one position, of the actuator output means.

Yet another feature of the invention resides broadly in an actuator for operation of a system for a motor vehicle, such as a clutch system of a motor vehicle, the actuator comprising: actuator output means being disposed to act on the system for a motor vehicle; the actuator output means comprising means for moving the actuator output means linearly along a range of movement; the means for moving the actuator output means linearly along a range of movement comprising an actuator motor being coupled to the actuator output means for the transmission of force to the actuator output means; means for inhibiting movement of the actuator output means so as to inhibit linear movement, in at least one position, of the actuator output means.

BRIEF DESCRIPTION OF THE DRAWINGS

This invention is explained in greater detail below with reference to the preferred embodiments which are illustrated in the accompanying drawings.

DESCRIPTION OF THE PREFERRED EMBODIMENT

Figure 1:
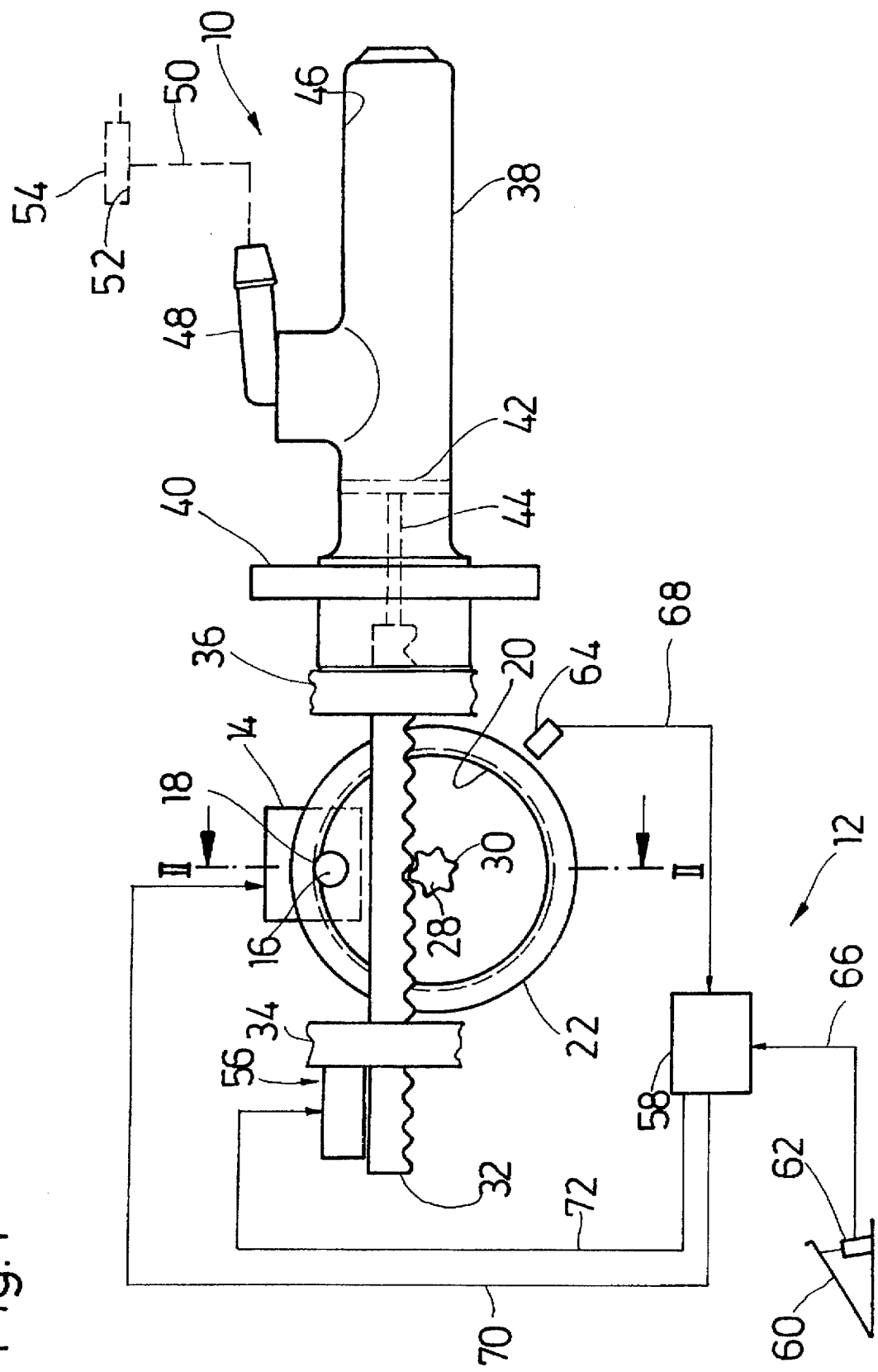
FIG. 1 shows a schematic overall view of an actuator device according to one embodiment of the invention, which is part of an actuation system used to control the actuator device.
Figure 2:
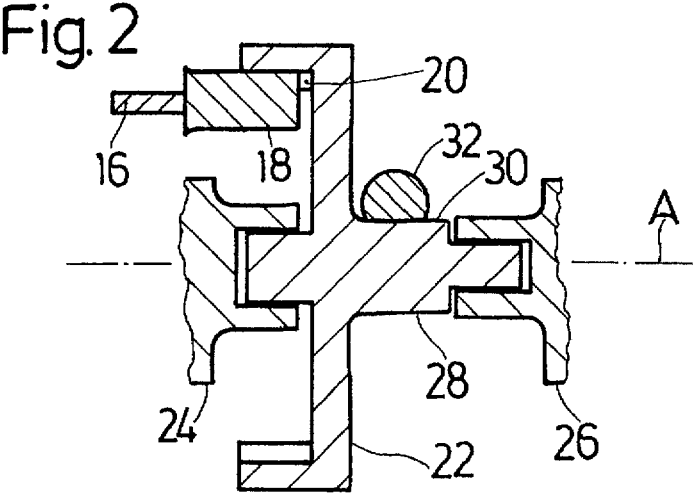
FIG. 2 is a cross section of the actuator device of the invention along a Line II—II in FIG. 1.

FIG. 1 shows an actuator device 10 according to one embodiment of the invention. The actuator device 10 is part of an actuator system 12. The actuator device 10 comprises an actuator motor 14 which, on an output shaft 16, supports a motor gear wheel 18 (See also FIG. 2). The motor gear wheel 18 is engaged with the internal gear teeth 20 (shown only schematically in FIG. 1) of a ring gear 22. The ring gear 22 is mounted in ring gear bearings 24, 26 (shown in FIG. 2), which can be fastened, for example, to an actuator device housing not shown in the figures, and which bearings 24, 26 can also rotate around an axis A. The ring gear 22 has a toothed drive segment 28 which has external gear teeth 30, which segment is concentric to the axis A and extends toward the axis A. The toothed drive segment 28 is engaged with an output element which is realized in the form of a toothed rack 32. The toothed rack 32 is in turn guided, e.g. in toothed rack guides 34, 36 which are firmly fastened to the housing, so that the toothed rack 32 can move in a longitudinal direction of the toothed rack 32.

As a result of the activation of the actuator motor 14, the rotational movement of the motor gear wheel 18 is transmitted to the ring gear 22 by the internal gear teeth 20 of the ring gear 22 which are engaged with the motor gear wheel 18. By means of the toothed drive segment 28 which also rotates and the external gear teeth 30 which are engaged with the tooted rack 32, the rotational movement of the ring gear 22 is converted into a linear movement of the toothed rack 32.

In an additional possible embodiment of the invention, the actuator motor 14 can be coupled directly to the toothed rack 32. For example, the output shaft 16 of actuator motor 14 could connect directly to ring gear 22, rather than through the coupling of motor gear wheel 18 which engages internal gear teeth 20 of ring gear 22. The direct connection of output shaft 16 to ring gear 22 could be accomplished by modifying ring gear bearing 24 so that there would be a hole through bearing 24 concentric with axis A, which hole would allow output shaft 16 to pass and connect directly to gear ring 22, which gear ring 22 has external gear teeth 30 which engage directly to toothed rack 32. In this embodiment actuator motor 14 and output shaft 16 would have to be mounted, so that the drive axis of actuator motor 14 and output shaft 16 are concentric with axis A.

In one embodiment of the invention, the mechanism connecting the actuator motor 14 to toothed rack 32 can function as speed reducing means or a step-down transmission. In the embodiment of the invention shown in FIG. 1, gear ring 22 functions as speed reducing means or a step-down transmission. That is, motor gear wheel 18, which has a relatively small radius, engages ring gear 22 near the edge of ring gear 22, which ring gear 22 has a relatively large radius. Therefore, ring gear 22 has a slower angular velocity than motor gear wheel 18. In turn, toothed drive segment 28 having gear teeth 30 has a relatively small radius. Therefore, when toothed drive segment 28 engages and drives toothed rack 32, the linear velocity of toothed rack 32 is relatively slow when compared to motor gear wheel 18, hence a speed reduction or step-down transmission function is produced.

In an additional embodiment of the invention the mechanism connecting the actuator motor 14 to toothed rack 32 can function as speed increasing means or a step-up transmission. The embodiment of FIG. 1 could be easily modified to function as a step up transmission. First, motor gear wheel 18 would have to be enlarged so that the outer diameter would be larger than the outer diameter of ring gear 22. In addition, actuator motor 14, output shaft 16, and gear wheel 18 would have to be mounted eccentric to ring gear 22 so that the outside circumference of motor gear wheel 18 engages the outside circumference, of ring gear 22, and ring gear 22 would have to be modified to have external gear teeth on the outside circumference so that the outside circumference of ring gear 22 and gear wheel 18 can engage on another. Thus, if motor gear wheel 18 is larger than ring gear 22 the speed of the toothed rack 32 would be increased compared to the embodiment pictured in FIG. 1, hence a speed increase or step-up transmission function would result. It is worth noting that a change in the diameter of toothed drive segment 28 having gear teeth 30 will also affect speed.

FIG. 1 shows the actuator device according to one embodiment of the invention in connection with a master cylinder 38, e.g. for a vehicle clutch. But it goes without saying that the actuator device of the invention can also be used in connection with other elements to be actuated. The master cylinder 38 in turn is fastened by means of a carrier 40, e.g. on the housing of the actuator device 10. A piston 42 of the master cylinder 38—the piston 42 is illustrated in the broken lines in FIG. 1—is also connected to the toothed rack 32 by means of a piston rod 44, which is also depicted in broken lines. As a result of a linear movement of the toothed rack 32, therefore, the piston 42 inside the master cylinder 38 is also moved back and forth in a linear manner, whereby a fluid pressure is generated which corresponds to the respective actuation position of the toothed rack 32 or of the actuator device 10. By means of a fluid outlet 48, the fluid inside the fluid pressure chamber 46 can exit the chamber 46, or enter it, depending on the position of the piston 42. The fluid outlet 48 is connected by means of a fluid connection in the form of a fluid line 50 (shown schematically and indicated in broken lines in FIG. 1) to a fluid pressure chamber 52 of a slave cylinder 54. The slave cylinder 54 then moves a clutch, for example, or a similar object.

The actuator device 10 according to one embodiment of the invention also comprises movement blocking means 56 which are indicated only schematically in FIG. 1, and are described in greater detail with reference to FIGS. 5 to 10. The movement blocking means 56 are used to block the actuator device 10 of the invention in the at least one actuation position. If, for example, a clutch which is actuated by the slave cylinder 54 is to be held in an open, e.g., released position, then by blocking the movement of the actuator device 10 of the invention in this released position, the activation of the actuator motor 14 can be terminated. The actuator device 10 is then blocked against moving out of the released position essentially only by the movement blocking means 56. Consequently, in this actuation position, on one hand, the energy required for the uninterrupted activation of the actuator motor 14 can be saved, and, on the other hand, damage to the actuator motor 14 resulting from the uninterrupted flow of current to the motor 14 in a position in which the rotor of the motor 14 is not turning, and thus a very high current is flowing into the motor windings, can be prevented.

The actuator system 12 according to one embodiment of the invention and illustrated in FIG. 1, which includes the actuator device 10 of the invention, comprises, in addition to the actuator device 10 described above, a control device 58, an actuator element 60, e.g. a clutch pedal 60, with an activation position sensor 62 which detects the activation position of the clutch pedal 60, and an actuation position sensor 64 which detects an actuation position of the actuator device 10. Although in FIG. 1, the actuation position sensor 64 is illustrated so that it can detect, for example, a rotational position of the ring gear 22, a number of other actuation position sensors are possible, e.g. an actuation position sensor which detects the linear position of the toothed rack 32, or an actuation position sensor which directly detects the rotational position of the actuator motor 14.

The control device 58 receives an activation position signal from the activation position sensor 62 via a signal line 66, and receives an actuation position signal from the actuation position sensor 64 via a signal line 68. The control device 58 also contains storage means (not shown in the figure), in which, for example, a number of specified actuation positions can be stored, in which specified actuation positions of the actuator device 10 can be blocked against movement by the movement blocking means 56, as a function of the activation of the actuator element 60.

One type of operation in which the actuation system 12 of the invention can be operated is described below. The control device 58 continuously receives the activation position signal from the activation position sensor 62, and the actuation position signal from the actuation position sensor 64. The control device 58 assigns the respective signals respectively to an activation position of the actuator element 60 or to an actuation position of the actuator device 10. By comparing the activation position of the actuator element 60 determined in this manner with the actuation position of the actuator device 10 determined in this manner, the control device 58 can determine whether the actuator device 10 is in the position requested by the driver of a motor vehicle, for example, as indicated by depressing the clutch pedal 60.

If, for example, the clutch pedal 60 is pressed all the way to the floor by the driver, which corresponds to a completely released position of the clutch, and if the control device 58 determines by comparing the activation position of the clutch pedal 60 with the instantaneous actuation position that the actuator device 19 is not yet in the actuation position which corresponds to the completely released position of the clutch, the control device 58, by means of a signal line 70, emits an activation signal to the actuator motor 14, which activates this motor 14 and moves the actuator device 10 into an actuation position which corresponds to the fully released position of the clutch. If the driver keeps the clutch pedal 60 depressed, i.e. if the activation position signal emitted by the activation position sensor 62 does not change, and if it is determined by a comparison of the activation position signal with the actuation position signal supplied by the actuation position sensor 64 that the instantaneous actuation position of the actuator device 10 then corresponds to the activation position assumed as a result of the depression of the clutch pedal 60, the control device 58, by means of a signal line 72, emits a blocking signal to the movement blocking means 56. The movement blocking means 56 then blocks, in the embodiment illustrated in FIG. 1, the toothed rack 32 against a linear movement, and thus fixes the position of the actuator device 10 in this actuation position which corresponds to the fully released position of the clutch. Then, the control device 58 ends the emission of the activation signal to the actuator motor 14 via the signal line 70, whereupon this motor 14 is deactivated, i.e. it is no longer energized. The actuator device 10 of the invention is then held in the desired actuation position only by the movement blocking means 56. The actuator motor 14 is no longer driven or energized, which means, on one hand, that the energy which would otherwise be necessary in this static position of the actuator 14 can be saved, and on the other hand damage to the actuator motor 14 caused by the electrical current flowing into the windings of the actuator motor 14 can be prevented.

If the clutch pedal 60 is then released by the driver, or is moved into another activation position, the activation position signal emitted by the activation position sensor 62 to the control device 58 changes via the signal line 66. The control device 58 then determines that the activation position corresponding to the activation position signal no longer corresponds to the actuation position of the actuator device 10, which corresponds to the instantaneous actuation position signal. The control device 58 then ends the emission of the blocking signal via the signal line 72 to the movement blocking means 56, and then emits a repeated activation signal via the signal line 70 to the actuator motor 14, to activate the latter and to move the actuator device 10 into the actuation position which corresponds to the instantaneous activation position of the clutch pedal 60. In this new actuation position, in the same manner as described above, the actuator device 10 can once again be blocked by the movement blocking means 56 to prevent movement.

Although the actuator system according to one embodiment of the invention has been described above with relation to its use for the actuation of a clutch device, it goes without saying that the actuator system of the invention can also be used for a number of other systems to be actuated.

Figure 3:
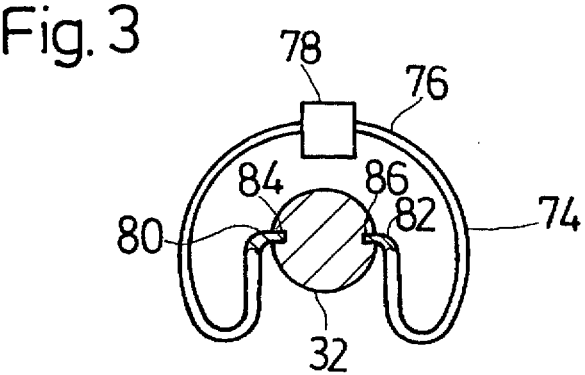
FIG. 3 is a cross section along a Line III—III in FIG. 4, which shows bias means used to bias the actuator device in an actuation limit position.
Figure 4:
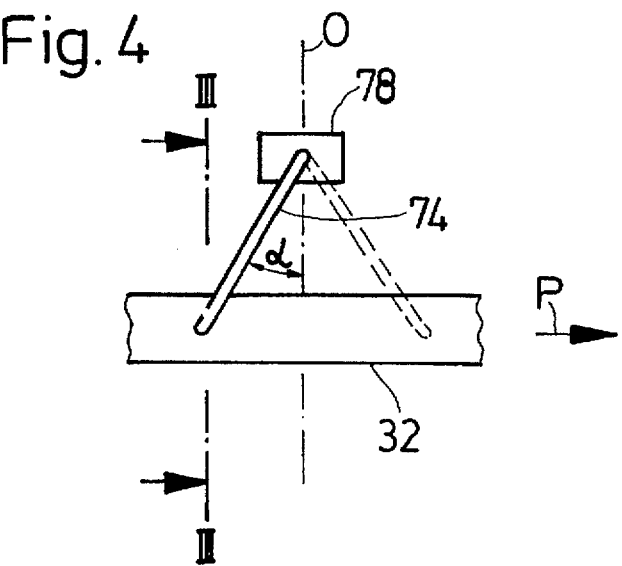
FIG. 4 is a side view of the bias means illustrated in FIG. 3.

FIGS. 3 and 4 show a bias spring 74, by means of which the actuator device 10 can be biased in one or in two actuation limit positions. The bias spring 74 is attached in a central segment 76 of the spring 74 to a spring carrier 78 which bias spring 74 is mounted, for example, so that it can pivot on a spring carrier 78 which is in turn attached firmly to the housing. Terminal segments 80, 82 of the bias spring 74 can be engaged in lateral openings 84, 86 of the toothed rack 32. A tension is thereby applied between the free ends 80, 82 and the intermediate segment 76 of the bias spring 74, which pushes the free ends 80, 82 of the bias spring 74 away from the intermediate segment 76. If the toothed rack 32 is then in a position in which an acute angle α is formed between the bias spring 74 and ax axis O which is essentially orthogonal to the toothed rack 32, then as a result of the compression force applied between the intermediate segment 76 and the free ends 80 and 82 respectively of the bias spring 74, the toothed rack 32 is moved in a direction in which the angle α is increased. In other words, in the position of the bias spring 74 illustrated by the solid line in FIG. 4, the toothed rack 32 is pushed in a direction opposite to the direction indicated by the arrow P. As a result of the action of the bias spring 74, the actuator device of the invention is then biased into an actuation limit position. The angle α, which in the actuation limit position is enclosed between the bias spring 74 and the orthogonal axis O, is preferably in the range between 30° and 45°.

If the toothed rack 32 is then moved out of the position of the bias spring 74 illustrated in FIG. 4 by a solid line, in the direction indicated by the arrow P, first the bias force of the bias spring 74 must be overcome, before the bias spring 74 reaches its top dead center position, in which the angle α=0, i.e. the bias spring is essentially orthogonal to the longitudinal direction of the toothed rack 32. If the toothed rack 32 is moved beyond this top dead center position of the bias spring 74, then as a result of the compression force acting between the free ends 80, 82 and the intermediate segment 76 of the bias spring 74, the toothed rack 32 is pushed farther by the bias spring 74 until it reaches a position which corresponds to an additional or second actuation limit position of the toothed rack 32. This second actuation limit position is illustrated in FIG. 4 by means of broken lines of the bias spring 74. The toothed rack 32 can thus be biased in two actuation limit positions by one single bias spring 74.

In other words, the bias spring 74 can be configured so that the spring 74 will tend to hold the toothed rack 32 in the position in which spring 74 is shown by a solid line in FIG. 4. When the toothed rack 32 is then moved in the direction of arrow P, the bias force of bias spring 74 must be overcome because the free ends 80, 82 of bias spring 74 are being pushed closer to the intermediate segment 76 of bias spring 74, which compresses bias spring 74. The bias force of bias spring 74 will continue to oppose movement in direction P until the bias spring 74 reaches the top dead center position, at which point α=0, so that the bias spring 74 is in line with axis O, and the bias spring 74 is orthogonal to the toothed rack 32. As the toothed rack 32 continues to move in direction P, beyond the top dead center position, the free ends 80, 82 of the bias spring 74 will push away from the intermediate segment 76 of the bias spring 74, so that the bias spring 74 will produce a bias force which pushes the toothed rack 32 in the direction of P, until a position of the bias spring 74, shown by the broken lines in FIG. 4, is reached. The toothed rack 32 can thus be biased in two actuation positions by the single bias spring 74. The two actuation position provided for by the bias spring 74 are generally the two extremes in the range of motion of the actuator device 10. That is, bias spring 74 will bend to hold the actuator device 10 in each of the two limits of the range of motion of the actuator device 10, and bias spring 74 will tend to restrict movement of the actuator device 10 beyond the limit positions also. For example, when the actuator device is used to control a clutch, one of the limit positions would hold the clutch in the engaged position and the other limit position would hold the clutch in the fully disengaged position.

If the bias force if the bias spring 74 is set correspondingly high, it is possible to use the bias spring 74 as the movement blocking means. If the actuator device is in one of its actuation limit positions, then the toothed rack 32 can be blocked to prevent movement in this actuation limit position by the bias force of the bias spring 74, and unless additional drive energy is provided by the actuator motor 14, the toothed rack 32 cannot be moved out of this respective actuation limit position.

Figure 5:
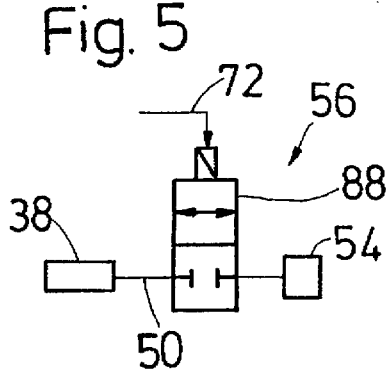
FIG. 5 shows a valve system located in a fluid line as a first embodiment of movement blocking means.

With regard to FIGS. 5 to 10, a number of different movement blocking means 56 are described below, all of which can be used with the actuator device according to one embodiment of the invention and/or with the actuator system of the invention. In FIG. 5, the movement blocking means comprise a valve 88 which is located in the fluid line 50 between the master cylinder 38 and the slave cylinder 54. The valve 88, as described with reference to FIG. 1, can be connected by means of the signal line 72 to the control device 58. If it is desirable to fix the actuator device 10 of the invention in a specified actuation position, all that is necessary is to interrupt the fluid connection between the master cylinder 38 and the slave cylinder 54 by means of the vale 88, so that no further fluid can flow through the fluid line 50. As a result of this interruption of the fluid connection, the piston 42 is then also blocked in the master cylinder 38 and thus the toothed rack 32 coupled to the piston 42 is blocked to prevent movement, and the entire actuator device 10 is fixed in this actuation position. By mean of a subsequent opening of the valve 88 or of the fluid line 50, the interruption of the fluid connection can essentially be eliminated, and the fluid can once again flow freely from the master cylinder 38 to the slave cylinder 54, and the actuator device 10 can once again move freely.

Figure 6:
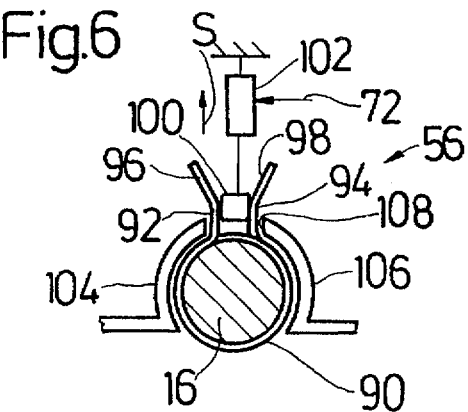
FIG. 6 shows a spiral clamping spring as a second embodiment of movement blocking means.

In FIG. 6, the movement blocking means 56 comprise a coil clamping spring 90 which surrounds the motor output shaft 16 of the actuator motor 14 in a spiral fashion. The coil clamping spring 90 comprises two turns, and its free ends 92, 94 are bent so that they extend essentially orthogonally from the motor output shaft 16. Terminal segments 96, 98 of the free ends 92, 94 of the coil clamping spring 90 are thereby also bent so that they extend away from one another. The purpose of this configuration is so that a clamping spring release slide or bar 100 can be inserted between the terminal segments 96, 98 or can be extracted once again from this position inserted between the terminal segments 96, 98. The clamping spring release slide 100 can thereby be moved by a slide actuator 102, which in itself is constructed in a known or conventional manner, either in the direction indicated by the arrow S, or in the opposite direction. The actuator 102 receives the blocking signal via the signal line 72, whereupon it extracts the clamping spring release slide 100 from the inserted position between the terminal segments 96, 98 illustrated in FIG. 6. In the inserted position, as a result of the spreading apart of the free ends 92, 94 of the coil clamping spring 90, the clamping seat of the coil clamping spring 90 on the motor output shaft 16 is released. But, by extracting the clamping spring release slide 100, the coil clamping spring 90 can contract, and is thereby clamped fast on the motor output shaft 16.

The motor output shaft 16 is surrounded in the vicinity of the coil clamping spring 90 by rotational movement blocking segments 104, 106, which form an opening 108 between them. The free ends 92, 94 of the coil clamping spring 90 extend outward through this opening 108. The rotational movement blocking segments 104, 106 prevent a rotation of the coil clamping spring 90 with the motor output shaft 16, and thus prevent a rotation of the motor output shaft 16, when the clamping spring release slide 100 is extracted from the position illustrated in FIG. 6, an the coil clamping spring 90 is in its clamping position.

In one preferred embodiment, slide actuator 102 comprise a solenoid. In one preferred embodiment, coil clamping spring 90 surrounds motor output shaft 16 with at least two turns, as shown in FIG. 6.

Figure 7:
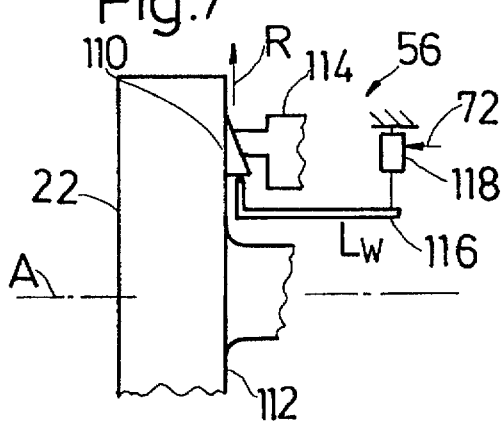
FIG. 7 shows a wedging device as a third embodiment of the movement blocking means.

In FIG. 7, the movement blocking means 56 comprise a wedge 110 which can be inserted between a lateral surface 112 of the ring gear 22 and a matching wedging segment 114 which is firmly attached to the housing, in the direction indicated by the arrow R or in the opposite direction. The wedge 110 can thereby be moved by means of a lever 116 which is mounted so that it can pivot on a shaft W, and by an actuator 118 which acts on the lever 116. The actuator 118 in turn receives the blocking signal via the signal line 72, and then, by pivoting, the lever 116 pushes the wedge 110 in the direction indicated by the arrow R into its wedging position, in which, as a result of the clamping action between the matching wedging segment 114 and the ring gear 22, it blocks the ring gear 22 from rotational movement around the axis A, and thus fixes the entire actuator apparatus in a specified actuator position. By pivoting the lever 116 back by means of the actuator 118, the wedge 110 can be moved in the direction opposite to the direction indicated by the arrow R back out of this wedged position. The ring gear 22 and thus the entire actuator device can then be moved freely once again.

In one preferred embodiment, actuator 118 comprises a solenoid. In addition, shaft W is pivotally mounted near the center of shaft W, so that when the end of the shaft W near lever 116 is moved closer to actuator 118 the end of shaft W near wedge 110 moves down and disengages wedge 110 from a blocking position. The opposite is also the case; that is, when the end of shaft W near lever 116 is moved away from actuator 118 the end of shaft W near wedge 110 moves up and engages wedge 110 into a blocking position.

By means of the movement blocking means described with reference to FIGS. 5 to 7, the actuator device 10 according to one embodiment of the invention, as described above with reference to the actuator system 12 illustrated in FIG. 1, can be blocked to prevent movement in a number of actuation positions. With these blocking means, there are no preferred positions in which the respective movement blocking means block the actuator device to prevent movement. It is thereby possible to block the actuator device to prevent movement in any desired actuation position, and in particular it is possible, after the actuator device of the invention has been successfully operated one or more times, to store additional actuation positions in the control device, with which the detected activation position and the detected actuation position can be compared, and if the positions are the same, the actuator device can be secured to prevent movement, and the actuator motor 14 can be deactivated.

Figure 8:
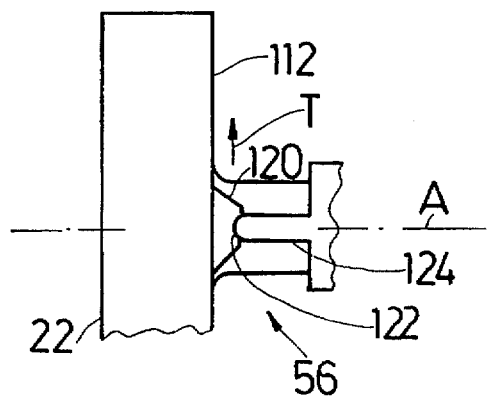
FIGS. 8–10 show locking means as fourth to sixth embodiments of the movement blocking means.

The movement blocking means 56 illustrated in FIG. 8 comprise a locking spring 120 made of elastically deformable material, such as spring steel or a similar material, which is fastened to the lateral surface 112 of the ring gear 22. The locking spring 120 has a locking depression 122. If the ring gear 22 rotates around the axis A, the locking spring 120 is moved, e.g. in the direction indicated by the arrow T, in the peripheral direction around the axis A. The locking spring 120 is thereby moved into a position which corresponds to the position illustrated in FIG. 8. In the position shown in FIG. 8, the locking depression 122 is oriented so that it corresponds to a locking projection 124 which is firmly connected to the housing. When the locking spring 120 moves in the direction indicated by the arrow T, the sliding of the locking projection 124 along the lateral flanks of the spring 120 initially deforms the spring 120, until the locking projection 124 catches in the locking notch 122. The ring gear 22 is thus fixed by means of the locking action in the actuation position illustrated in FIG. 8. In this position, the excitation of the actuator motor can be terminated, until it is once gain necessary to change the actuation position. Then, by activating the actuator motor, first the locking moment of the locking spring 120 must be overcome, until the locking projection 124 can be moved out of the locking notch 122.

It is possible to have a plurality of locking springs 120 on the lateral surface 112 of the ring gear 22, to provide a plurality of such actuation positions, in which the ring gear 22 can be prevented from moving by means of the locking action.

Figure 9:
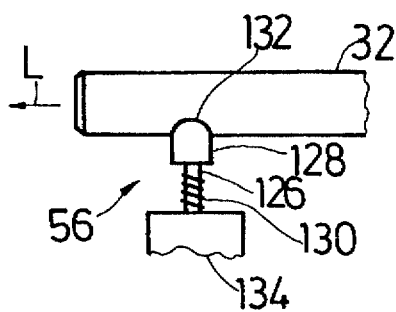

In FIG. 9, the movement blocking means 56 comprise a locking pin 126 with a locking lug 128, which, in the locking position illustrated in FIG. 9 is engaged in a locking recess 132 of the toothed rack 32. The locking pin 126 is attached in a pin holder 134 which is firmly attached to the housing, so that it can move toward or away from the toothed rack 32, and is biased by a coil compression spring 130 toward the toothed rack 32. If the toothed rack 32 moves in the direction indicated by the arrow L, the locking recess 132 moves into the locking position illustrated in FIG. 9, in which the locking lug 128 is engaged in the locking recess 132, and thus the toothed rack 32 is fixed in position by the locking action to prevent the toothed rack 32 from moving in the direction of tis longitudinal axis. In this position shown in FIG. 9, the excitation of the drive motor 14 can be terminated. If the actuator device is to be moved out of this actuation position into another actuation position, first by activation of the drive motor 14, the locking moment of the locking lug 128 is overcome, i.e. the coil compression spring 130 is compressed, so that as a result of the movement of the toothed rack 32 in the direction L or opposite to the direction L, the locking lug 128 is pushed out of the locking recess 132 and the actuator device can once again move freely. In this embodiment of the movement blocking means 56, it is also possible to provide a plurality of such locking recesses 132 along the toothed rack 32, to provide in turn a plurality of actuator positions in which the actuator device is blocked by locking action to prevent movement.

Figure 10:
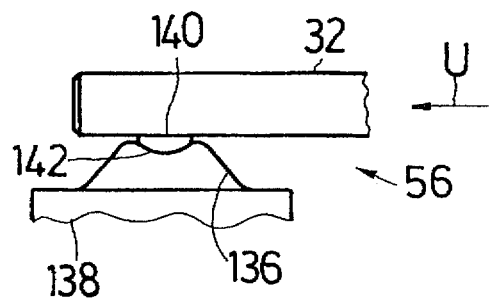

FIG. 10 illustrates an additional embodiment of the movement blocking means 56, which essentially corresponds to the embodiment illustrated in FIG. 8. But in FIG. 10, the locking spring 136 is fixed in place on a housing segment 138. On the toothed rack 32 there is a locking lug 140 which, when the toothed rack 32 moves in the direction indicated by the arrow U or in the opposite direction, arrives at the locking position illustrated in FIG. 10, which locking lug 140 is engaged in a locking depression 142 of the locking spring 136. In this embodiment, too, there can also be a plurality of such locking lugs 140 on the toothed rack 32, to provide a plurality of actuation positions, in which the actuator device is blocked by the locking action to prevent movement.

On the movement blocking means illustrated in FIGS. 8 to 10, the presence of simple locking means can provide a plurality of actuation positions, in which the actuator device can be blocked to prevent movement without additional actuator means, whereby the construction of the actuator device of the invention becomes very simple and thus economical. The use of the actuator device with such movement blocking means in an actuator system according to one embodiment of the invention is then possible. To provide a plurality of actuation positions in which the actuator device can be blocked to prevent movement, it is also possible to provide a plurality of locking means, such as the locking spring or the locking recess, not on the ring gear or on the toothed rack, or not only on the ring gear or on the toothed rack, but to also provide a plurality of such locking means, e.g. the locking lug or the locking pin, on the housing. Thus, the number of positions provided by the actuator device, and in which this movement can be prevented, can be significantly increased.

An additional possible variant of the movement blocking means comprises a toothed blocking segment on the toothed rack 32 and/or the external gear teeth 30 on the ring gear 22. This toothed blocking segment is located so that it discourages or totally prevents the linear movement of the toothed rack 32 or the rotational movement of the ring gear 22, when the actuator device 10 is in the at least one actuation position. If the movement is completely prevented by the toothed blocking segment, this segment acts independently as the blocking means. If the movement is only made more difficult by the toothed blocking segment, the holding of the actuator device 10 in the at least one actuation position is further facilitated. This feature is advantageous in particular when the blocking means are not the mechanical means illustrated in the figures, but an additional variant not illustrated in the figures.

Figure 1A:
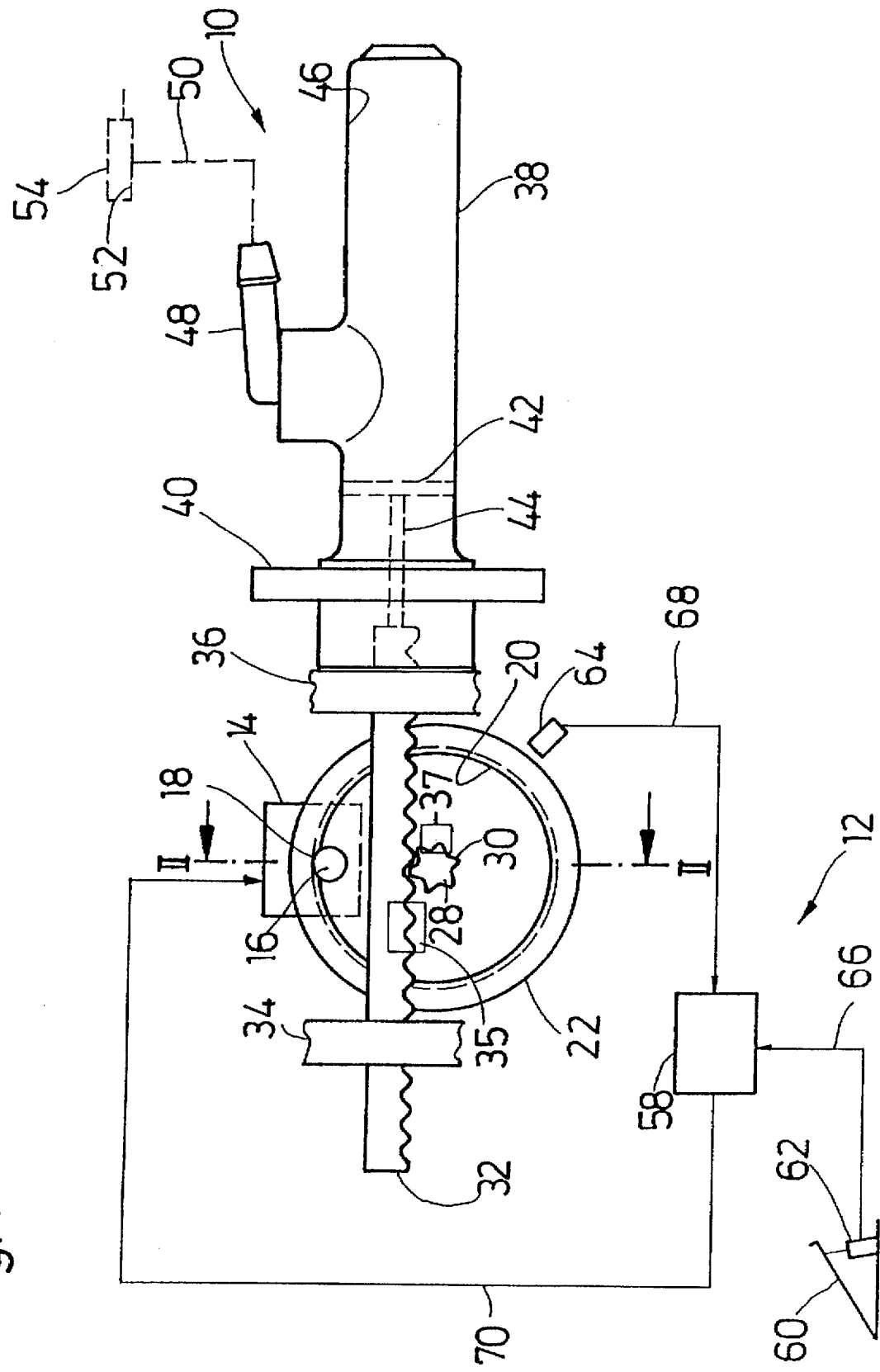
FIG. 1A shows a schematic overall view of an actuator device according to one embodiment of the invention which as a toothed blocking segment as an embodiment of movement blocking means, which is part of an actuation system used to control the actuator device.

A possible embodiment of the actuator device 10 having a toothed blocking segment is shown in FIG. 1A. A rack toothed blocking segment 35 is a modified section of the teeth on toothed rack 32, which rack toothed blocking segment 35 is shown schematically in FIG. 1A. The teeth of the rack toothed blocking segment 35 are modified to engage, and tend to bind, with the gear teeth 30, thus blocking movement when the actuator device 10 is in the at least one actuation position. Alternatively, a gear toothed blocking segment 37 is a modified section of the gear teeth 30 of the toothed drive segment 28, which gear toothed blocking segment 37 is shown schematically in FIG. 1A. The teeth of the gear toothed blocking segment 37 are modified to engage and tend to bind with the teeth of toothed rack 32, thus blocking movement when the actuator device 10 is in the at least one actuation position. An additional preferred embodiment of the actuator device 10 includes both the rack toothed blocking segment 35 and the gear tooth blocking segment 37, where the modified teeth of each of the toothed blocking segments 35, 37 tend to bind with one another. When either or both of the toothed blocking segments are engaged, as discussed in the three possible embodiments pictured in FIG. 1A, it makes movement of the actuator device 10 out of the art least one actuation position difficult. This type of arrangement is advantageous in particular when the actuator device 10 is blocked in the actuation position by the continuous supply of a current to the actuator motor 14, since on account of the mechanical binding of the rack toothed blocking segment 35 and/or the gear toothed blocking segment 37, there is already a degree of self-locking action of the actuator device, which makes it possible to reduce the blocking current supplied to the actuator motor. A signal could be transmitted via signal line 70 to reduce the current to the actuator motor 14, which reduces energy consumption and wear on actuator motor 14. Since the toothed blocking segment is a modification of the basic parts of the actuator, no additional mechanical elements are required for blocking.

One possible embodiment of the modified teeth of the toothed blocking segment, is to construct the modified teeth to be slightly wider than the teeth which do not have a blocking function. The wider teeth of the toothed blocking segment 35, 37 will tend to bind the unmodified teeth of the toothed rack 32 or the unmodified teeth of the toothed drive segment 28. Similarly if both the toothed rack 32 and the toothed drive segment 28 each have the toothed blocking segments, the modified wider teeth of the toothed blocking segments will tend to bind one another. An alterative modification of the toothed blocking segment would be to vary the pitch compared to the unmodified teeth to facilitate binding or locking.

This variant comprises means which can continuously supply a blocking current to the actuator motor 14 in the at lest one actuation position and thereby prevent a movement of the actuator device out of the at least one actuator position. If the actuator device of the invention is thereby used, for example, to actuate a clutch device, it is advantageous if the latter has a reduced release force, so that the actuator motor in the at least one actuation position does not have to be blocked against an excessively large force by the feed of the blocking current. If the actuator device is used to actuate a device which itself does not exert any restoring force on the actuator device, it is advantageous to provide bias means, by means of which the actuator device can be pushed into a specified position, and against the force of which the actuator motor can then be excited to block the actuator device.

One embodiment of the invention is an actuator device used to operate a clutch device, which clutch device has a reduced release force. That is, the force needed to hold the clutch in a disengaged position is reduced. The advantage is that the current required by the actuator motor to hold the clutch in the disengaged position could be reduced or even eliminated. An example of a clutch device which has a reduced release force can be found in the following patent documents, each of which is assigned to the assignee of the present invention; U.S. pending patent application Ser. No. 08/275,341 entitled "Friction Clutch, such as for a Motor Vehicle, with Flat Spring Characteristics", which claims priority from German Published Patent Application No. DE-OS 44 12 106.7 and also claims priority from German Published Patent Application No. DE-OS 43 23 857.2.

Although the actuator device according to one embodiment of the invention and illustrated in FIG. 1 is part of an actuator system, it goes without saying that the actuator device of the invention can also be used without an actuator system. It is also possible in particular, when the actuator device according to one embodiment of the invention is used in an actuator system, to prevent the movement of the actuator device in the at least one actuation position by the means described above to supply a blocking current to the actuator motor. In other words, if the desired at least one actuation position has been reached and the actuator device is to be held in this position, the activation of the actuator motor in the "drive" mode is terminated, and a "blocking activation" of the actuator motor is continued. During this blocking activation of the actuator motor, the actuator motor is supplied with a blocking current which guarantees that the actuator device is held in this special actuator position. To subsequently move the actuator device into a new actuation position, the "blocking activation" of the actuator motor is then terminated, and the activation in the "drive" mode is resumed.

In other words, the actuator device could be used without the entire actuator system. That is, according to one embodiment of the invention, the control device is not needed to make the actuator device operational; an example would be when bias spring 74 is used as movement blocking means. Bias spring 74 is able to hold the actuator device in two different actuator positions without the control device. However, one advantage of using the actuator device as part of the entire actuator system is that when the actuator device is in a preferred actuation position, the control device can reduce the current to the actuator motor. The reduced current or blocking current is capable of holding the actuator device in a preferred actuation position, and the reduced current reduces energy consumption and wear on the actuator motor.

One the actuator device according to one embodiment of the invention, it is possible to hold the actuator device in a specified actuator position without having to uninterruptedly activate the actuator motor of the drive device in the drive mode. On one hand, that conserves energy, and on the other hand, damage to the actuator motor caused by the very high electrical current flowing into the motor windings in a static actuation position can be prevented. The actuator device according to one embodiment of the invention also makes it possible to block the actuator device in a plurality of actuator positions to prevent movement, so that the actuator device of the invention or the actuator system of the invention can be used for a number of different applications.

In other words, in some inventions actuator devices are designed so that when a preferred actuation position is reached the actuator device cannot move further. For example, the mechanical movement of a component may come in contact with the housing or the movement of a piston of an hydraulic cylinder may come to the end of the cylinder. In these two examples, it is not possible for the actuator motor to move the mechanism further. To maintain the preferred actuation position the actuator motor is maintained in the drive mode. Maintaining the actuator motor in the drive mode requires high current and wears the actuator motor. In contrast, according to one embodiment of the present invention, instead of holding a preferred actuation position by continuing a high current drive mode of the actuator motor the present invention reduces the current to a blocking current of the actuator motor which reduces energy consumption and wear to the actuator motor.

An additional embodiment which could use the actuator device of the invention with or without the complete actuator system is a centrally-controlled door lock system. According to one additional embodiment the actuator device of the invention could be used as part of a vehicle braking system.

Figure 11:
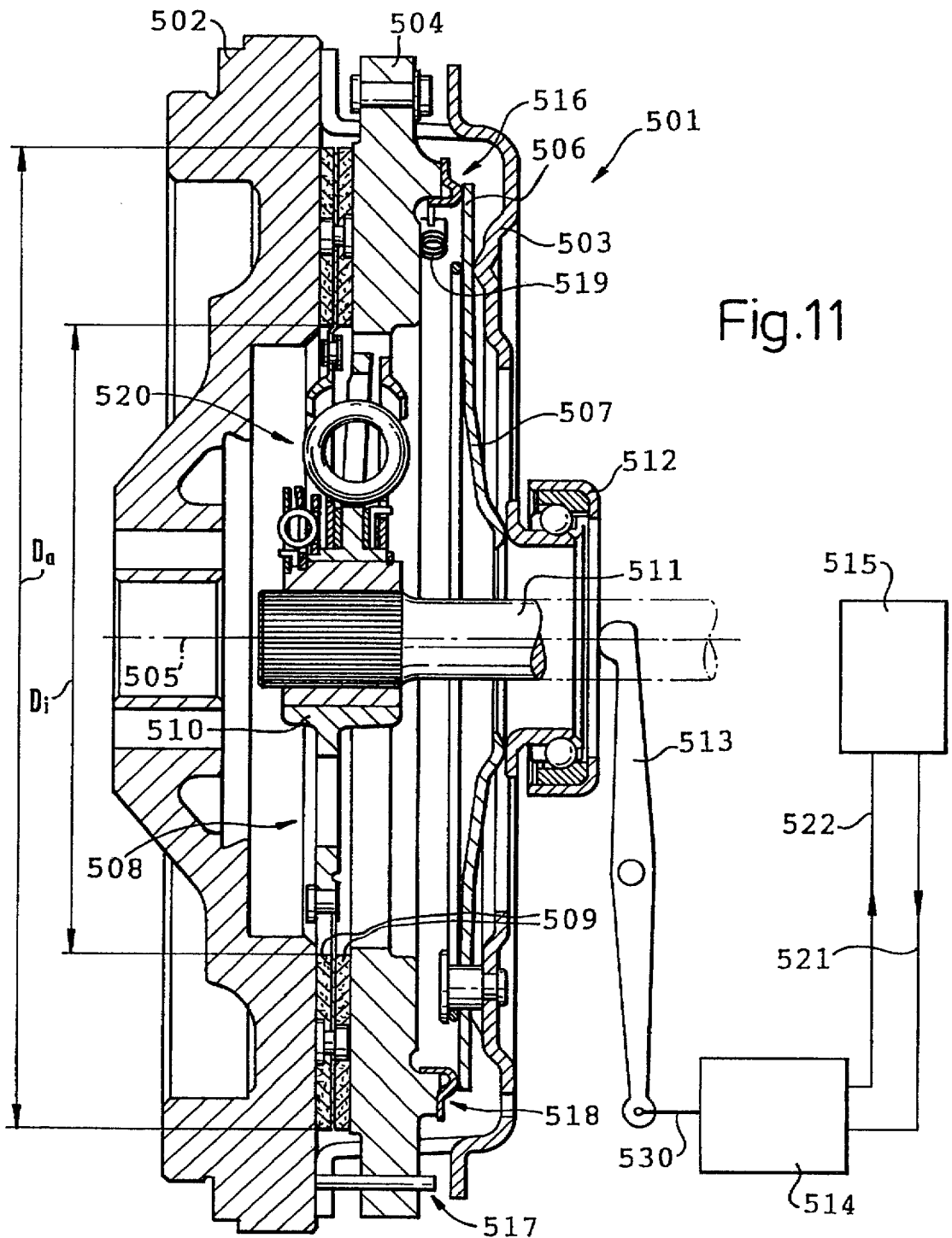
FIG. 11 shows a friction clutch in longitudinal section, with a schematic illustration of the actuator and the electronic control system.

FIG. 11 shows a friction clutch 501 having an actuator 514 and a control system 515. As shown in FIG. 11, a friction clutch 501 can include a flywheel 502 fastened to a crankshaft (not shown). The clutch housing 503 can be firmly mounted on the flywheel 502. Inside the clutch housing 503 there can preferably be an application plate 504 which can be non-rotationally connected to the clutch housing 503, but which can be guided so that it can move axially. This guidance can be conventionally provided by means of tangential leaf springs. Pressure could be applied to the application plate toward the flywheel 502 by a main clutch spring which could be in the form of a membrane spring 506. The membrane spring 506 can preferably be mounted so that it can pivot on an intermediate diameter on the clutch housing 503, act with its radially outer edge on the application plate 504, and be provided toward the radial inside with a plurality of flexible tabs 507. These flexible tabs 507 can be elastically deformed toward the flywheel 502 by a release bearing 512, whereby the membrane spring 506 can preferably pivot in the opposite direction on its outside periphery and release the application plate 504. The release bearing 512 can be actuated by means of a release fork 513, which release fork 513 can be connected by means of a transmission element 530 to an actuator 514, which actuator 514 can be controlled by means of an electronic control system 515, which electronic control system 515 can be connected to the actuator 514 by means of a control line 521 and/or by means of a sensor line 522.

A clutch disc 508, which can preferably have friction linings 509 in its radially outer area, can be located axially between the flywheel 502 and the application plate 504. The clutch disc 508 can be provided with a torsional vibration damper 520. The clutch disc 508 can be non-rotationally mounted by means of hub 510 on the transmission shaft 511, which transmission shaft 511 defines an axis of rotation 505.

All the components of the friction clutch 501 which would be driven by the flywheel 502 can rotate around the axis of rotation 505. The friction clutch 501 can be provided with a device 516 which would make an automatic adjustment to compensate for wear. This device 516 can consist, for example, of a turning ring 518 which can preferably be located on the application plate 504 and essentially concentric to the axis of rotation 505, namely between the application plate 504 and the membrane spring 506.

Opposite the application plate 504, the turning ring 518 can be provided with bevelled surfaces which would preferably run in the peripheral direction, and the turning ring 518 can be biased in the peripheral direction by a spring 519. The force of the spring 519 can be directed so that during a rotational motion, the turning ring 518 can run up over the bevelled surfaces and increase the distance from the application plate 504. The application plate 504 can also be provided with a travel limiting device 517 which would preferably limit the release movement of the application plate 504 with respect to the clutch housing 503.

In this case, the clutch disc 508 is provided with friction linings 509, the ratio of the outside diameter $D_a$ of which to the inside diameter $D_i$ is less than 1.4. In this manner, a very large average friction radius can be provided with reference to the outside diameter $D_a$, which means that the friction clutch 501 can preferably be operated with a low application force of the membrane spring 506.

Figure 12:
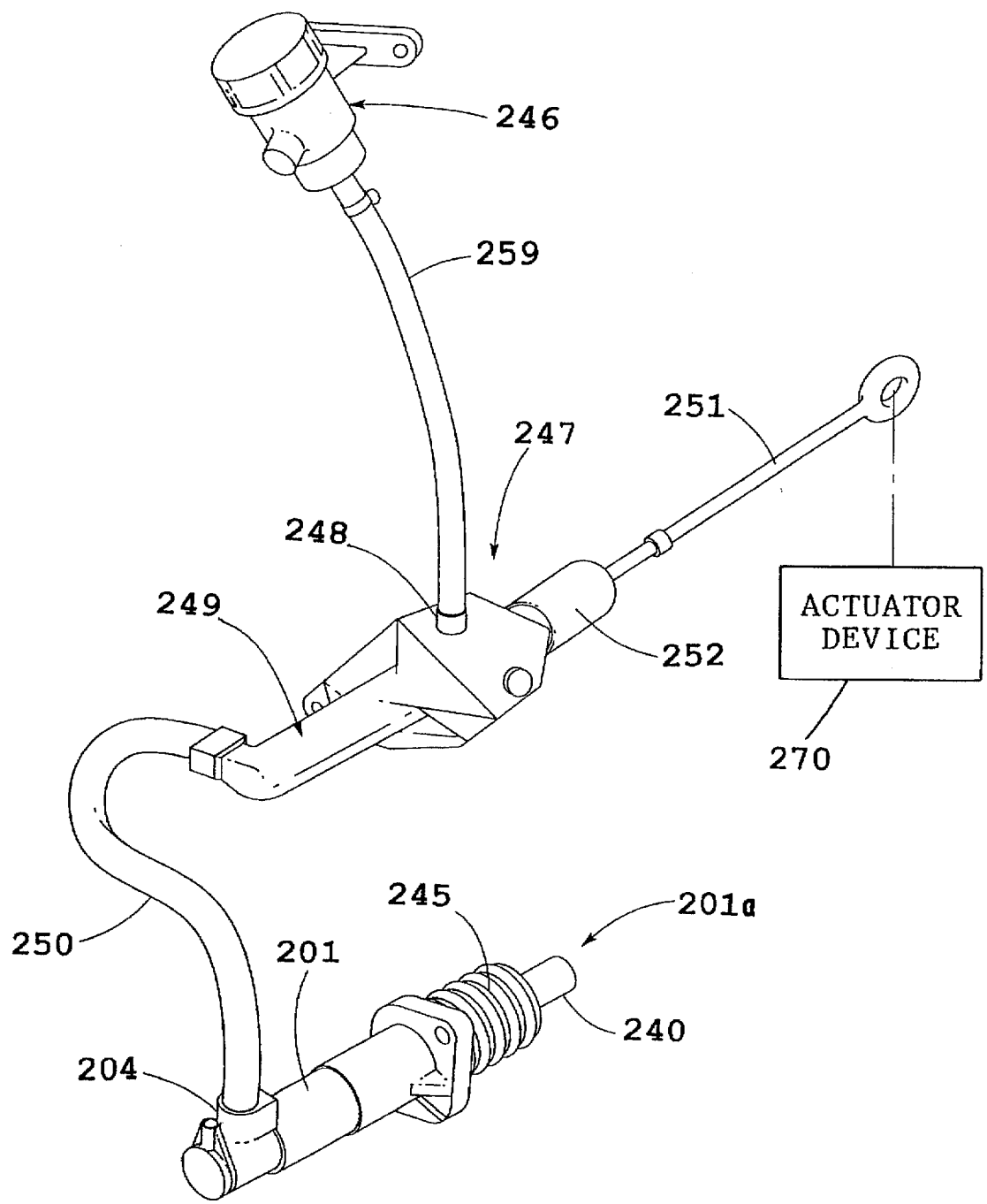
FIG. 12 shows an hydraulic cylinder system using the actuator system of the present invention.
Figure 13:
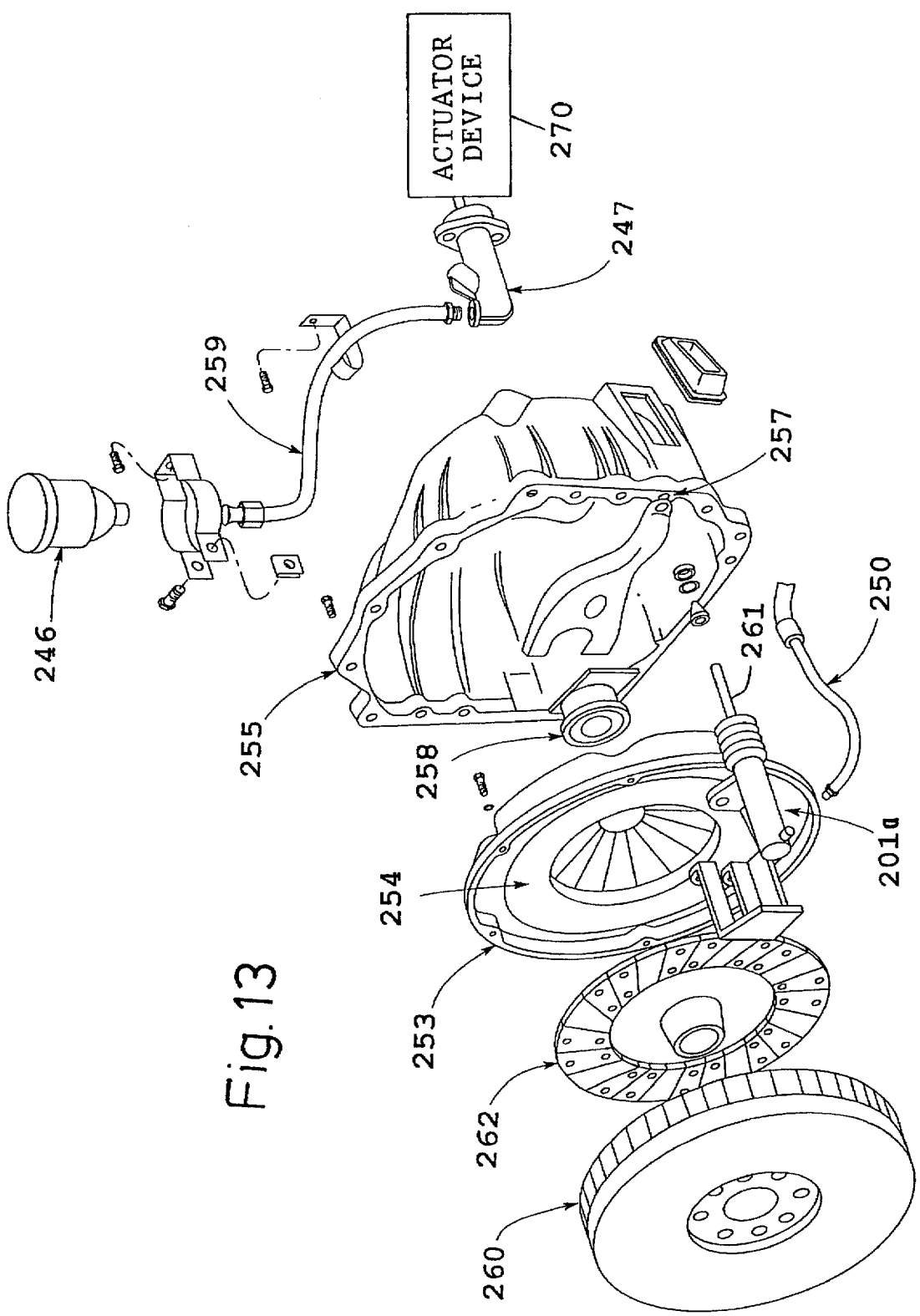
FIG. 13 shows a vehicle clutch system using the hydraulic cylinder system of FIG. 12.

As shown in FIG. 12, the cylinder 201a, in accordance with the present invention, could be used as a slave cylinder in a hydraulic clutch system. Such a system can preferably have a remote fluid reservoir 246 and a clutch master cylinder 247, the two being connected to one another by means of a line 259. The clutch master cylinder 247 can preferably be operated essentially directly off of the actuator device 270, the actuator device 270 being shown schematically in FIG. 12. In addition, the master cylinder 247 can also have a protective boot 252. The cylinder or slave cylinder 201a can preferably be mounted on the clutch housing (as shown in FIG. 13). The connecting element 240 can preferably be attached to the clutch release fork or throwout lever (not shown here, but see FIG. 13).

The clutch master cylinder 247, in accordance with the embodiment shown in FIG. 12, preferably operates as the pump for pumping hydraulic fluid from reservoir 246, via a connection 248 and cylinder 249, to the slave cylinder 201a. When the actuator device 270 is activated, hydraulic fluid under pressure can be pumped into the slave cylinder 201a, via a line 250, and can cause the piston rod 261 (as shown in FIG. 13) to extend. The outer end of the piston rod 261 can cause the clutch release fork 257 to pivot and force a clutch release bearing 258 (not shown here, but see FIG. 13) to disengage the clutch. Since hydraulic systems are generally self-adjusting, when the clutch pedal is released, hydraulic pressure can fall, and the piston rod 261 of the slave cylinder can retreat. A spring can preferably serve to maintain the piston rod 261 in contact with the clutch release fork.

FIG. 13 shows a more complete hydraulic clutch system including a flywheel 260, a clutch disc 262, a clutch cover 253 having a movable pressure plate 254 disposed therein, and a clutch housing 255. In addition, the clutch system can also include a throwout or release bearing 258 and a clutch release fork or throwout lever 257, which release fork 257 can preferably be operatively attached to the slave cylinder 201a. The slave cylinder 201a can preferably be connected, via line 250, to master cylinder 247, the actual connection of which is not shown here for purposes of simplicity. The master cylinder 247 can preferably be connected to actuator device 270, and to the reservoir 246 by means of line 259. The actuator device 270 is shown schematically in FIG. 13.

One feature of the invention resides broadly in the actuator device, in particular for a vehicle, comprising: an actuator motor 14, an output element 32 which is coupled to the actuator motor 14 for the transmission of force, which can move in particular in linear fashion, and which acts on an element to be actuated, characterized by movement blocking means 56 to block the actuator device 10 to prevent movement in at least one actuation position.

Another feature of the invention resides broadly in the actuator device characterized by the fact that the output element is coupled directly to the actuator motor.

Yet another feature of the invention resides broadly in the actuator device characterized by the fact that the output element 32 is coupled to the actuator motor 14 by means of intermediate elements 22.

Still another feature of the invention resides broadly in the actuator device characterized by the fact that the intermediate means 22 comprise speed reducing means or speed increasing means.

A further feature of the invention resides broadly in the actuator device characterized by the fact that the output element 32 comprises a toothed rack 32.

Another feature of the invention resides broadly in the actuator device characterized by the fact that the movement blocking means 56 comprise mechanical movement blocking means.

Yet another feature of the invention resides broadly in the actuator device characterized by the fact that the movement blocking means 56 comprise locking means 120, 124; 126, 128, 132; 136, 140 which block the actuator device 10 in the at least one actuation position by locking to prevent movement.

Still another feature of the invention resides broadly in the actuator device characterized by the fact that the movement blocking means comprise wedging means 110, 114 which can be moved in the at least one actuation position into a wedging position, in which wedging position the actuator device 10 is blocked to prevent movement.

A further device of the invention resides broadly in the actuator device characterized by the fact that the movement blocking means 56 comprise a coil clamping spring 90 which surrounds a motor output shaft 16 of the actuator motor 14 in spiral fashion, as well as clamping spring release means 100, 102 for the selective attachment and release from a clamping position of the coil clamping spring 90 on the motor output shaft 16, whereby the coil clamping spring 90 is blocked by the rotational movement blocking means 104, 106 which prevent it from rotating with the motor output shaft 16.

Another feature of the invention resides broadly in the actuator device characterized by the fact that the coil clamping spring 90 comprises at least two turns.

Yet another feature of the invention resides broadly in the actuator device characterized by the fact that the movement blocking means comprise means for the continuous supply of the actuator motor with a blocking current in the at least one actuation position.

Still another feature of the invention resides broadly in the actuator device characterized by the fact that the actuator motor, to block the actuator device in the at least one actuation position, requires a blocking current of less than 10 A, and preferably less than 6 A.

A further feature of the invention resides broadly in the actuator device characterized by the fact that on the toothed rack 32 and/or on the element 22 provided for the transmission of the rotational force of the actuator motor 14 to the toothed rack 32, there is a toothed blocking segment in the vicinity of the at least one actuation position.

Another feature of the invention resides broadly in the actuator device characterized by the fact that the toothed blocking segment makes an independent movement of the actuator device out of the at least one actuation position more difficult or offers resistance to movement of the actuator device out of the at least one actuation position.

Yet another feature of the invention resides broadly in the actuator device characterized by the fact that the toothed blocking segment prevents an independent movement of the actuator device out of the at least one actuation position.

Still another feature of the invention resides broadly in the actuator device characterized by the fact that the output element 32 is coupled to a master cylinder 38 for the selective generation of a fluid discharge pressure in a fluid pressure chamber 46 of the master cylinder 38.

A further feature of the invention resides broadly in the actuator device characterized by the fact that fluid pressure chamber 46 of the master cylinder 38 is connected by means of a fluid connection to a fluid pressure chamber 52 of a slave cylinder 54 by means of a fluid line 50 and that the movement blocking mean 56 comprise valve means 88 for the selective interruption and opening of the fluid connection.

Another feature of the invention resides broadly in the actuator device characterized by bias means 74, by means of which the actuator device is biased in at least one actuation limit position.

Yet another feature of the invention resides broadly in the actuator system, in particular for a vehicle, comprising an actuator device 10, whereby the actuator system also comprises: an actuator element 60 with an activation position sensor 62 to detect an activation position of the actuator element 60 and to emit an activation position signal which corresponds to the activation position detected, an actuation position sensor 64 to detect an actuation position of the actuator device 10 and to emit an actuation position signal which corresponds to the actuation position detected, a control device 58 to receive the activation position signal and the actuation position signal and to activate the drive motor 14 as a function of the signals received, whereby the control device 58 compares the activation position signal with the actuation position signal and a reference actuation value which corresponds to the at least one actuation position, and then, if the activation position detected does not correspond to the actuation position detected, activates the actuator motor 14 in the drive mode, until the activation position detected corresponds to the actuation position detected, and then, when the activation position detected corresponds to the actuation position detected and the at least one actuation position, terminates the activation of the actuator motor 14 in the drive mode.

Still another feature of the invention relates broadly in the actuator system characterized by the fact that the movement blocking means 56 can be actuated by the control device 58 to block the actuator device 10 to prevent movement, when the activation position detected corresponds to the actuator position detected and to the at least one actuation position.

A further feature of the invention resides broadly in the use of the actuator device and of the actuator system to actuate a clutch device.

Another feature of the invention resides broadly in the use of the actuator device and of the actuator system to actuate a clutch device with reduced release force.

Some examples of control systems and control system components which may be utilized in accordance with the present invention may be found in the following U.S. Pat. Nos.: No. 5,325,082 entitled "Comprehensive Vehicle Information Storage System"; No. 5,199,325 entitled "Electronic Shift or Clutch Actuator for a Vehicle Transmission" to Dana Corporation; No. 5,303,807 entitled "Electrohydraulic Device for Controlling the Engagement of the Clutch in Motor Vehicles and the Like" to Fadiel; No. 5,339,069 entitled "Brake Monitoring System"; No. 5,271,269 entitled "Rotary Position Transducer"; No. 5,339,906 entitled "Position Feedback Mechanism for an Implement"; No. 5,025,563 entitled "Multiturn Absolute Encoder"; No. 5,132,851 entitled "Side Mirror Rotating Apparatus Including a Transducer with a Signal Transmitter and a Signal Receiver"; No. 5,254,926 entitled "Current-mode Hysteresis Control for Controlling a Motor" to Ford; No. 5,281,900 entitled "DC Motor Controller" to Hyundai; No. 5,304,912 entitled "Control Apparatus for Induction Motor" to Hitachi; No. 5,313,151 entitled "Induction Type Electric Motor Drive Actuator System" to Rotork; No. 5,350,988 entitled "Digital Motor Controller" to AlliedSignal, Inc.; No. 5,289,117 entitled "Testing of Integrated Circuit Devices on Loaded Printed Circuit" to Everett Charles; No. 5,307,290 entitled "System for the Automatic Testing, Preferably on a Bench, of Electronic Control Systems Which are Intended to be Fitted in Vehicles" to Fiat; No. 5,315,252 entitled "Automotive Test System with Input Protection" to SPX Corporation; No. 5,307,549, Inventors: Seisuke Tsutsumi and Nobuyuki Ito, Title: Apparatus and method for synchronized control of machine tools; No. 4,852,419, Inventors: Friedrich Kittel, Dieter Lutz, Franz Nagler, Horst Oppitz and Gerhard Gasper, Title: Control device, in particular for a motor-vehicle friction clutch; No. 5,212,380, Inventors: Seiichi Sato, Kazuo Yamaguchi, Yoshi Kurosawa, Atsushi Ueda and Masami Matsumura, Title: Automotive engine control system with rotary encoder indexing; No. 5,326,160, Inventors: John P. Bayliss and Sean Byrnes, Title: Hydraulic systems for vehicles; U.S. Pat. No. 5,307,013, Inventors: Alfred J. Santos and Michael C. Brauer, Title: Digital position sensor system for detecting automatic transmission gear modes.

Some examples of hydraulic master cylinders which may be utilized in accordance with the present invention may be found in the following U.S. Pat. Nos.: No. 5,211,099 entitled "Slave Cylinder for a Hydraulic Actuating System of a Motor Vehicle Friction Clutch" to Fichtel & Sachs; No. 5,213,187 entitled "Device Relating to a Semi-automatic Clutch for Vehicles"; No. 5,284,017 entitled "Hydraulic Master Cylinder" to Automotive Products; and No. 5,301,597 entitled "Hydraulic Cylinder " to Kugelfischer Schafer.

Some examples of clutch assemblies and various components associated therewith which could possibly utilize the present invention may be disclosed in the following U.S. U.S. Pat. No. 4,684,007 to Maucher, entitled "Clutch Plate"; U.S. Pat. No. 4,635,780 to Wiggen, entitled "Clutch Disc for a Motor Vehicle Friction Clutch"; U.S. Pat. No. 4,651,857 to Schraut et al., entitled "Clutch Disc Unit for a Motor Vehicle Friction Clutch"; U.S. Pat. No. 5,103,688 to Kuhne, entitled "Two-mass Flywheel"; U.S. Pat. No. 5,335,762 to Raue, entitled "Clutch with a Synchronizing Device"; and U.S. Pat. No. 4,777,843 to Bopp, entitled "Two-mass Flywheel Assembly With Viscous Damping Assembly".

An example of a clutch assembly which could possibly utilize the present invention is disclosed in U.S. pending patent application Ser. No. 08/541,628 entitled "Friction Clutch with Adjustment for Wear" which claims priority from German Published Patent Application No. DE-OS 44 36 111.4.

Some examples of hydraulic clutch systems which could possibly utilize the present invention are disclosed by the following U.S. patents, each of which is assigned to the assignee of the present invention: U.S. Pat. No. 5,211,099 to Grosspietsch et al., date May 18, 1993 and entitled "Slave Cylinder for a Hydraulic Actuating System of a Motor Vehicle Friction Clutch"; U.S. Pat. No. 5,052,279 To Limbacher and Fadler, dated Oct. 1, 1991 and entitled "Hydraulic Cylinder for a Hydraulic Actuation Arrangement of a Motor Vehicle Friction Clutch"; and U.S. Pat. No. 4,456,111 to Limbacher, dated Jun. 26, 1984 and entitled "Hydraulic Control System for a Clutch".

Some additional examples of hydraulic and/or pneumatic devices which can possibly utilize the present invention are disclosed by the following U.S. Pat. Nos.: No. 5,092,125 to Leight et al., entitled "Seal"; No. 4,635,778 to Lederman, entitled "Fluid-Operated Piston"; No. 4,960,188 to Wossner, entitled "Single-Tube Vibration Damper of Variable Damping Force"; U.S. Pat. No. 5,064,030 to Wossner, entitled "Impact Damping Unit"; U.S. Pat. No. 4,599,860 to Parsons, entitled "Liquid Pressure Apparatus"; and U.S. Pat. No. 2,317,601 to Fowler on Mar. 7, 1940, entitled "Pressure Braking System".

Hydraulic systems which could also possibly utilize the present invention may be disclosed in the following U.S. Pat Nos.: No. 4,634,190 to Wupper, entitled "Hydraulic Brake System With Slip Control", U.S. Pat. No. 4,643,488 to Reinartz, entitled "Hydraulic Vehicle Servo Brake"; U.S. Pat. No. 4,643,489 to Reinartz et al., entitled "Hydraulic Brake System With Slip Control"; U.S. Pat. No. 4,656,833 to Belart, entitled "Hydraulic Brake System for Automotive Vehicles"; and U.S. Pat. No. 4,902,077 to Belart et al., entitled "Hydraulic Brake System".

Some possible of examples of toothed blocking segments which can be used in the present invention are found in the following U.S. Pat. Nos.: No. 4,899,609 entitled "Gears having a Tooth-Profile with a Smaller Relative Curvature at a Contact Point"; No. 4,920,294 entitled "Synchronous or Stepping Motor with Simplified Tooth Alignment"; No. 4,970,423 entitled "Stepper Motor with a Rotor Teeth Sensor"; No. 4,972,109 entitled "Stepping Motor"; No. 5,210,739 entitled "Carriage Lock Apparatus"; and No. 5,292,289 "Internally Meshing Planetary Gear Assembly".

Some examples of movement blocking means which use a wedge and could possibly be used in the present invention are found in the following U.S. Pat. Nos.: No. 5,263,351 entitled "Locking Wedge Assembly for Two-Piece Mechanically Connected Mandrels"; No. 5,255,582 entitled "Tool Holder having Integral Wedge Clamping Mechanism"; No. 5,222,619 entitled "Enclosure with Wedge Locking Device"; No. 5,181,700 entitled "Clamping Apparatus"; No. 5,363,942 entitled "Braking Device for an Elevator"; and No. 5,178,216 entitled "Wedge Lock Ring".

Some examples of actuators which use a solenoid and could possibly be used in the present invention are found in the following U.S. Pat. Nos.: No. 5,227,750 entitled "Solenoid Operated Switching Device"; No. 5,293,143 entitled "Switch Device"; and No. 5,348,373 entitled "Electromechanical Release Mechanism for a Seat Assembly".

Some examples of electric motor control system using blocking currents and could possibly be used in the present invention can be found in the following U.S. Pat. Nos.: No. 4,893,067 entitled "Direct Current Motor Speed Control"; No. 4,897,882 entitled "Motor Control Apparatus and Method"; No. 4,902,954 entitled "Alternating Current Motor Control Apparatus"; and No. 4,907,108 entitled "Delayed-action Motor Control Circuit for Reducing Load Current".

Some examples of step-down and step-up mechanisms which could be possibly be used in the present invention can be found in the following U.S. Pat. Nos.: No. 5,187,993 entitled "Actuator for Remote Control"; No. 5,352,163 entitled "Step-up or Reduction Gear Series Using Internally Meshing Planetary Gear Structure"; No. 4995,861 entitled "Mechanical Shiftable Three Speed Planetary Transmission"; and No. 5,014,666 entitled "Load Adjustment Device".

Some examples of coil clamping springs which could possibly be used in the present invention can be found in the following U.S. Pat. Nos.: No. 5,287,949 entitled "Shaft Locking Device"; No. 5,273,229 entitled "Fixed Torque Spring Clutch"; No. 5,374,093 entitled "Gripper Assembly"; and No. 5,010,983 entitled "Shaft Locking Device".

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein are hereby incorporated by reference as if set forth in their entirety herein.

The corresponding foreign patent publication applications, namely, Federal Republic of Germany Patent Application No. 195 03 137.7, filed on Feb. 1, 1995, having inventors Lutz Leimbach and Reiner Voss, and DE-OS 195 03 137.7 and DE-PS 195 03 137.7, are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. A friction clutch system for a motor vehicle with an actuator for automated operation of said clutch, said friction clutch system comprising:

a clutch housing;

a clutch disc for being disposed on a transmission input shaft, the transmission input shaft having a longitudinal axis defining an axial direction parallel to the longitudinal axis, said clutch disc being axially movable along the transmission input shaft;

pressure plate means for engaging and disengaging said clutch disc with a flywheel, said pressure plate means being axially movable along the transmission input shaft;

said clutch disc comprising:

friction lining means disposed between said pressure plate means and the flywheel for contacting the flywheel and said pressure plate means upon engagement of said clutch disc;

membrane spring means disposed between said clutch housing and said pressure plate means for applying pressure to said pressure plate means; and a disengagement system for engaging and disengaging said clutch disc and said pressure plate means;

said disengagement system for engaging and disengaging being connected at a part of said membrane spring means;

said disengagement system comprising actuator means for automatically activating said disengagement system for engaging and disengaging said clutch disc and said pressure plate means and activating said part of said membrane spring;

said actuator means comprising:

actuator output means being disposed to act on said disengagement system;

said actuator output means comprising means for moving said actuator output means linearly along a range of movement;

said means for moving said actuator output means linearly along a range of movement comprising an actuator motor being coupled to said actuator output means, said actuator motor for the transmission of force to said actuator output means; and means for inhibiting movement of said actuator output means so as to inhibit linear movement, in at least one position, of said actuator output means;

said actuator output means comprising a toothed rack;

said means for inhibiting movement of said actuator output means comprising mechanical means for inhibiting movement of said actuator output means;

said mechanical means for inhibiting movement of said actuator output means only partially inhibiting linear movement, in at least one position, of said actuator output means; and said means for inhibiting movement of said actuator output means comprising means for continuously supplying a blocking current to said actuator motor to partially inhibit linear movement, in at least one position, of said actuator output means.

2. The friction clutch system according to claim 1 wherein said means for continuously supplying a blocking current comprises means for providing less than 10 Amperes.

3. The friction clutch system according to claim 2 wherein said means for continuously supplying a blocking current comprises means for proving less than 6 Amperes.

4. A friction clutch system for a motor vehicle with an actuator for automated operation of said clutch, said friction clutch system comprising:

a clutch housing;

a clutch disc for being disposed on a transmission input shaft, the transmission input shaft having a longitudinal axis defining an axial direction parallel to the longitudinal axis, said clutch disc being axially movable along the transmission input shaft;

pressure plate means for engaging and disengaging said clutch disc with a flywheel, said pressure plate means being axially movable along the transmission input shaft;

said clutch disc comprising:

friction lining means disposed between said pressure plate means and the flywheel for contacting the flywheel and said pressure plate means upon engagement of said clutch disc;

membrane spring means disposed between said clutch housing and said pressure plate means for applying pressure to said pressure plate means; and a disengagement system for engaging and disengaging said clutch disc and said pressure plate means;

said disengagement system for engaging and disengaging being connected at a part of said membrane spring means;

said disengagement system comprising actuator means for automatically activating said disengagement system for engaging and disengaging said clutch disc and said pressure plate means ad activating said part of said membrane spring;

said actuator means comprising:

actuator output means being disposed to act on said disengagement system;

said actuator output means comprising means for moving said actuator output means linearly along a range of movement;

said means for moving said actuator output means linearly along a range of movement comprising an actuator motor being coupled to said actuator output means, said actuator motor for the transmission of force to said actuator output means; and means for inhibiting movement of said actuator output means so as to inhibit linear movement, in at least one position, of said actuator output means;

said actuator output means comprising a toothed rack;

said means for inhibiting movement of said actuator output means comprising mechanical means for inhibiting movement of said actuator output means;

said means for moving said actuator output means linearly comprising a toothed rive gear, said toothed drive gear being disposed to engage said toothed rack, and said toothed drive gear being disposed to couple said actuator motor to said toothed rack for the transmission of force to said toothed rack; and at least one of said toothed rack and said toothed drive gear comprising a segment of binding teeth being configured and disposed to bind with the teeth of at least one of said toothed rack and said toothed drive gear, so as to inhibit linear movement, in at least one position, of said actuator output means.

5. The friction clutch system according to claim 4 wherein said segment of binding teeth comprises sole means for inhibiting linear movement, in at least one position, of said actuator output means.

6. The friction clutch system according to claim 4 wherein said actuator means comprises:

a master cylinder having a master fluid pressure chamber;

said actuator output means being coupled to said master cylinder to selectively generate a fluid discharge pressure in said master fluid pressure chamber of said master cylinder;

said master cylinder being coupled to said disengagement system for activating said disengagement system;

a slave cylinder having a slave fluid pressure chamber, said slave cylinder being coupled to said disengagement system for activating said disengagement system;

fluid line means for connecting said master fluid pressure chamber to the slave fluid pressure chamber; and said means for inhibiting movement of said actuator output means comprising valve means disposed for selectively interrupting and opening aid fluid line means, so as to inhibit linear movement, in at least one position, of said actuator output means.

7. The friction clutch system according to claim 6 wherein:

said means for inhibiting movement comprises bias spring means, said bias spring means being coupled to said actuator output means;

said actuator output means comprising means for moving said actuator output means linearly along said range of movement, said range of movement having a first extreme position and a second extreme position, said bias spring means being configured to bias said actuator output means in at least one of said first and second extreme positions.

8. The friction clutch system according to claim 7 wherein said actuator device comprises a control system, said control system comprising:

an actuator position control element being disposed to indicate a desired position of said actuator output means;

an actuator position control element sensor being disposed to detect said desired position of said actuator position control element, and said actuator position control element sensor being disposed to emit a desired position signal which corresponds to said desired position detected;

an actuator output means position sensor being disposed to detect an actual actuator output means position of said actuator output means and said actuator output means position sensor being disposed to emit an actual actuator output means position signal which corresponds to said actual actuator output means position detected;

a control device being disposed to receive said desired position signal and to receive said actual actuator output means position signal and said control device being disposed to activate said actuator motor as a function of said signals received, whereby said control device compares said desired position signal to said actual actuator output means position signal and a reference actuation value, which reference actuation value corresponds to said at least one position, and then, if said desired position signal does not corresponds to said actual actuator output means position signal, said control device activates said actuator motor into a drive mode, until said actual actuator position signal corresponds to said desired position signal and said reference value; and and then, when said actual actuator position signal corresponds to said desired position signal and said reference actuation value, said control device terminates the activation of said actuator motor in the drive mode.

* * * * *

UNITED STATES PATENT AND TRADEMARK OFFICE
CERTIFICATE OF CORRECTION

PATENT NO. : 5,678,671

DATED : October 21, 1997

INVENTOR(S) : Lutz LEIMBACH and Reiner VOSS

It is certified that error appears in the above-identified patent and that said Letters Patent is hereby corrected as shown below:

In column 4, line 8, after 'would', delete "overcomes" and insert --overcome--.

In column 6, line 53, after 'position,', delete "an" and insert --and--.

In column 6, line 62, after the first occurrence of 'pedal', delete "positioned" and insert --position--.

In column 7, line 41, after 'at', delete "lest" and insert --least--.

In column 12, line 48, after 'device', delete "19" and insert --10--.

UNITED STATES PATENT AND TRADEMARK OFFICE
CERTIFICATE OF CORRECTION

PATENT NO. : 5,678,671
DATED : October 21, 1997
INVENTOR(S) : Lutz LEIMBACH and Reiner VOSS It is certified that error appears in the above-identified patent and that said Letters Patent is hereby corrected as shown below:

In column 13, line 49, after 'and', delete "ax" and insert --an--.

In column 14, line 36, after 'will', delete "bend" and insert --tend--.

In column 14, line 67, before '88', delete "vale" and insert --valve--.

In column 15, line 46, after '6', delete "an" and insert --and--.

In column 17, line 9, after 'of', delete "tis" and insert --its--.

In column 18, line 29, after 'the', delete "art" and insert --at--.

In column 18, line 59, before 'one', delete "lest" and insert --least--.

UNITED STATES PATENT AND TRADEMARK OFFICE
CERTIFICATE OF CORRECTION

PATENT NO. : 5,678,671                               Page 3 of 4
DATED : October 21, 1997
INVENTOR(S) : Lutz LEIMBACH and Reiner VOSS It is certified that error appears in the above-identified patent and that said Letters Patent is hereby corrected as shown below:

In column 19, line 55, before 'the', delete "One" and insert --On--.

In column 22, line 35, after 'further', delete "device" and insert --feature--.

In column 23, line 24, after 'device' insert --10--.

In column 24, line 49, before "U.S. Pat." insert --Pat. Nos.:--

In column 25, line 1, after 'al.,' delete "date" and insert --dated--.

In column 25, line 57, after 'control', delete "system" and insert --systems--.

UNITED STATES PATENT AND TRADEMARK OFFICE
CERTIFICATE OF CORRECTION

PATENT NO. : 5,678,671
DATED : October 21, 1997
INVENTOR(S) : Lutz LEIMBACH and Reiner VOSS It is certified that error appears in the above-identified patent and that said Letters Patent is hereby corrected as shown below:

In column 28, line 2, Claim 4, after 'means', delete "ad" and insert --and--.

In column 28, line 24, Claim 4, after the first occurrence of 'toothed', delete "rive" and insert --drive--.

In column 28, line 56, Claim 6, after 'opening', delete "aid" and insert --said--.

Signed and Sealed this

Thirtieth Day of June, 1998

Attest:

BRUCE LEHMAN

Attesting Officer

Commissioner of Patents and Trademarks